United States Patent
Gulati

(10) Patent No.: US 10,268,844 B2
(45) Date of Patent: Apr. 23, 2019

(54) EMBEDDING FOUNDATIONAL ROOT OF TRUST USING SECURITY ALGORITHMS

(71) Applicant: Data I/O Corporation, Redmond, WA (US)

(72) Inventor: Rajeev Gulati, Sammamish, WA (US)

(73) Assignee: Data I/O Corporation, Redmond, WA (US)

( * ) Notice: Subject to any disclaimer, the term of this patent is extended or adjusted under 35 U.S.C. 154(b) by 0 days.

(21) Appl. No.: 15/669,873

(22) Filed: Aug. 4, 2017

(65) Prior Publication Data
US 2018/0039795 A1    Feb. 8, 2018

Related U.S. Application Data

(60) Provisional application No. 62/372,242, filed on Aug. 8, 2016.

(51) Int. Cl.
G06F 21/76 (2013.01)
G06F 21/72 (2013.01)
G06F 21/57 (2013.01)

(52) U.S. Cl.
CPC ............ G06F 21/76 (2013.01); G06F 21/572 (2013.01); G06F 21/72 (2013.01)

(58) Field of Classification Search
CPC .................................. G06F 21/76; G06F 21/72
USPC ..................................................... 726/16–21
See application file for complete search history.

(56) References Cited

U.S. PATENT DOCUMENTS

| | | | |
|---|---|---|---|
| 9,305,185 B1 * | 4/2016 | Pedersen | G06F 21/575 |
| 2005/0262361 A1 * | 11/2005 | Thibadeau | G06F 21/80 |
| | | | 713/193 |
| 2010/0058323 A1 | 3/2010 | Shahidzadeh et al. | |
| 2010/0146261 A1 | 6/2010 | Talstra et al. | |
| 2012/0185838 A1 | 7/2012 | Schwartzman et al. | |
| 2013/0191624 A1 | 7/2013 | Jarmany | |
| 2014/0068275 A1 * | 3/2014 | Swanson | G06F 21/57 |
| | | | 713/192 |
| 2015/0236856 A1 * | 8/2015 | Moore | H04L 9/3247 |
| | | | 713/176 |
| 2015/0350182 A1 * | 12/2015 | Pyle | H04L 29/14 |
| | | | 726/7 |
| 2016/0065592 A1 | 3/2016 | Svigals | |
| 2016/0191318 A1 * | 6/2016 | Neilson | H04L 41/0869 |
| | | | 709/220 |

(Continued)

OTHER PUBLICATIONS

Ferrus et al., "Security in transnational interoperable PPDR communications: Threats and requirements," 2015 2nd International Conference on Information and Communication Technologies for Disaster Management (ICT-DM) Year: 2015.*

(Continued)

*Primary Examiner* — Roderick Tolentino
(74) *Attorney, Agent, or Firm* — Wong & Rees LLP; Kirk D. Wong

(57) ABSTRACT

Approaches, techniques, and mechanisms are disclosed for provisioning programmable devices in a secure manner. The secure programming system can individually encrypt a target payload of data and code and then program the information into each individual one of the programmable devices targeted for a specific job. The secure programming system can create a customized payload package that can only be decrypted by a particular system or device having the correct security keys.

20 Claims, 13 Drawing Sheets

(56) References Cited

U.S. PATENT DOCUMENTS

| | | | |
|---|---|---|---|
| 2016/0232383 A1* | 8/2016 | Chakhaiyar | G06F 21/85 |
| 2016/0378976 A1* | 12/2016 | Kotary | G06F 21/53 |
| | | | 713/193 |
| 2017/0048070 A1* | 2/2017 | Gulati | H04L 9/3268 |
| 2017/0230365 A1* | 8/2017 | Poete | H04L 63/0876 |

OTHER PUBLICATIONS

Pohronska, Maria "FPGA implementation of multiple hardware watchdog timers for enhancing real-time systems security," 2011 IEEE EUROCON—International Conference on Computer as a Tool Year: 2011.*
World Intellectual Property Organization, Application No. PCT/US17/45804, International Search Report dated Nov. 8, 2017.
World Intellectual Property Organization, Application No. PCT/US17/45804, Pending Claims dated Nov. 8, 2017.

* cited by examiner

EMBEDDING FOUNDATIONAL ROOT OF TRUST USING SECURITY ALGORITHMS

PRIORITY CLAIM

This application claims benefit under 35 U.S.C. § 119(e) of Provisional Application Ser. No. 62/372,242, entitled EMBEDDING FOUNDATIONAL ROOT OF TRUST USING SECURITY ALGORITHMS, filed Aug. 8, 2016, the entire contents of which are hereby incorporated by reference as if fully set forth herein.

CROSS-REFERENCE TO RELATED APPLICATIONS

This application is related to Provisional Application Ser. No. 62/371,184, entitled COUNTERFEIT PREVENTION, filed Aug. 4, 2016, Provisional Application Ser. No. 62/401,953, entitled UNIFIED PROGRAMMING ENVIRONMENT FOR PROGRAMMABLE DEVICES, filed Sep. 30, 2016, and Non-Provisional application Ser. No. 15/640,438, entitled DEVICE PROGRAMMING WITH SYSTEM GENERATION, filed Jun. 30, 2017, each of which is owned by Applicant and is incorporated herein in its entirety by this reference thereto.

TECHNICAL FIELD

Embodiments relate generally to device programming systems, and, more specifically, to secure programming and verification systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Contract electronic component assembly can open valuable intellectual property to acts of piracy. The exposure of the intellectual property can cost the developer millions of dollars that were spent in the development. While various feeder machines and robotic handling systems populate electronic circuit boards with integrated circuits, the operations related to processing integrated circuits, such as programming, testing, calibration, and measurement are generally performed in separate areas on separate equipment rather than being integrated into the main production assembly lines.

Programmable devices such as Flash memories (Flash), electrically erasable programmable read only memories (EEPROM), programmable logic devices (PLDs), field programmable gate arrays (FPGAs), and microcontrollers incorporating non-volatile memory elements, can be configured with separate programming equipment, which is often located in a separate area from the circuit board assembly lines. In addition, system level components, such as smart phones, circuit boards, Internet of Things (IoT) devices, media players, can also require specific security configuration support.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
4.0. Example Embodiments
5.0. Implementation Mechanism—Hardware Overview
6.0. Extensions and Alternatives 1.0. General Overview Approaches, techniques, and mechanisms are disclosed for provisioning programmable devices in a secure manner. The secure programming system can individually encrypt a target payload of data and code and then program the information into each individual one of the programmable devices targeted for a specific job. The secure programming system can create a customized payload package that can only be decrypted by a particular system or device having the correct security keys.

The programmable devices can include memory chips, circuit boards, etc., and complete electronic devices such as smart phones, media players, other consumer and industrial electronic devices, etc. The configuration of the security keys can control the programming operation of the programmable devices.

According to an embodiment, the encryption of program data for an individual target payload on one of the programmable devices, such as a circuit board, can enable the circuit board to be configured to only work with components that have registered security codes. This can be used to ensure that circuit boards can only be manufactured with a certified category of parts.

According to an embodiment, when security codes are identified as invalid, programmable devices are not authorized to operate, e.g., to receive programming data or code or to send any user data back to a host system or a server, etc. Detection of such unauthorized operations eliminates counterfeit devices and secure devices that may be tampered with or compromised.

According to an embodiment, identifications (e.g., serial numbers, etc.) of unauthorized devices may be reported and saved for subsequent authentication processes. The stored identifications may be used as a priori information for subsequent authentication to reduce an overall verification time of the selected identifications.

According to an embodiment, the programmable devices can validate a serial number or other parameter as a prerequisite for operation of the device. In yet another embodiment, the programmable device can provide code signing facilities to authenticate code before execution.

In other aspects, the invention encompasses computer apparatuses and computer-readable media configured to carry out the foregoing techniques.

2.0. Structural Overview

Figure 1:
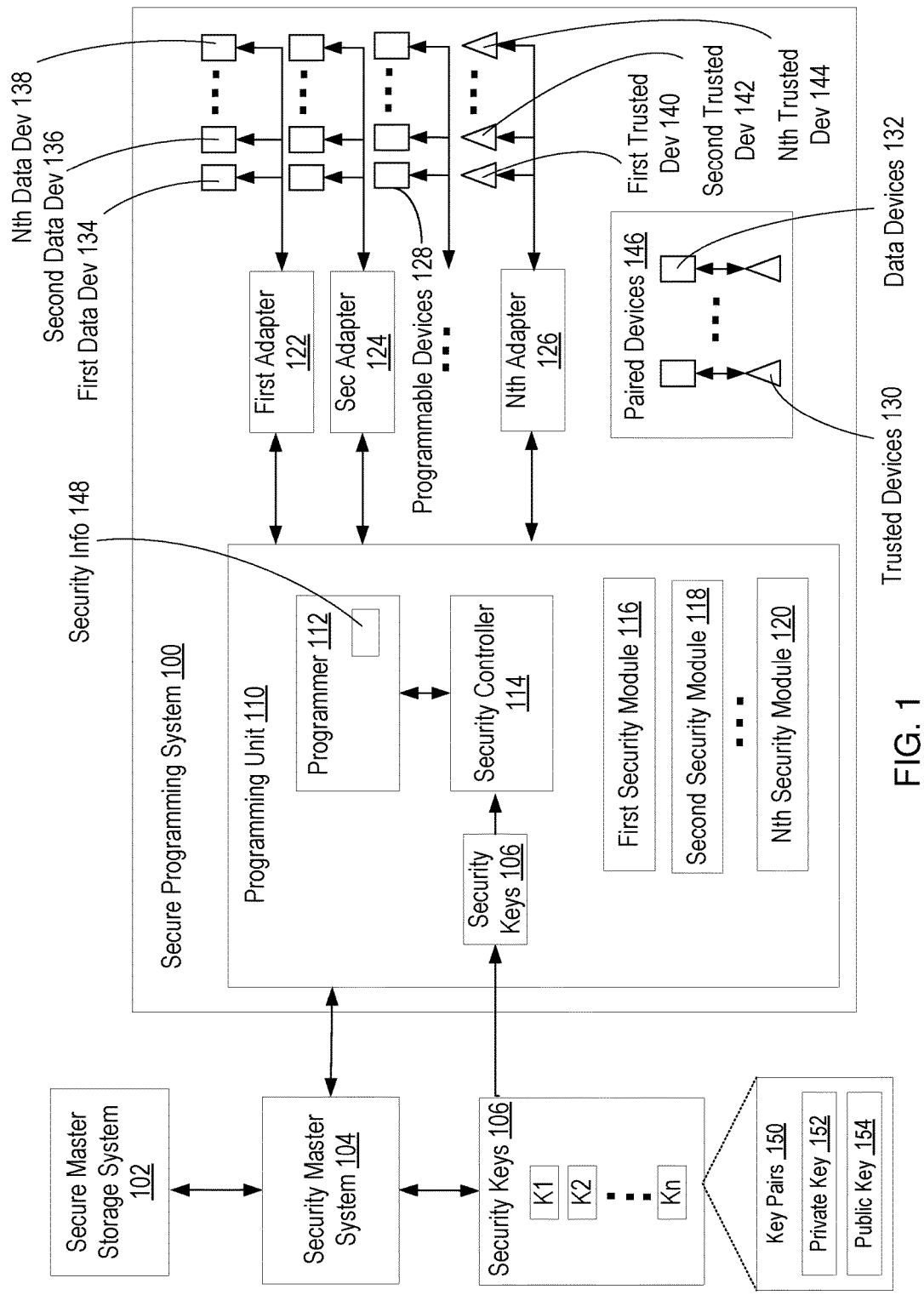
FIG. 1 depicts an illustrative view of a secure programming system, according to an embodiment.

Referring now to FIG. 1, therein is shown an illustrative view of various aspects of a secure programming system 100 in which the techniques described herein may be practiced, according to an embodiment. The secure programming system 100 can individually configure data devices and activate trusted devices with cryptographic information to provide a secure programming and operation environment.

The secure programming system 100 comprises a programming unit 110 having a programmer 112, a security controller 114, security keys 106, adapters for coupling to programmable devices 128, a first security module 116, a second security module 118, and an nth security module 120. The secure programming system 100 can be coupled to a security master system 104 having a secure master storage system 102. The security master system 104 and the secure master storage system 102 can generate and securely store the security keys 106 for encrypting and decrypting information. The security keys 106 can implement a variety of security paradigms. The security keys 106 can include key pairs 150 having a private key 152 and a public key 154. The key pairs 150 can be used to implement a public key cryptography system where data encrypted by the private key 152 can be decrypted using the public key 154. The secure programming system 100 can include as many different key pairs 150 as necessary. The key pairs 150, the private key 152, and the public key 154 can be implemented for different devices or system elements including the secure programming system 100, the programming unit 110, the programmer 112, the security controller 114, the security modules, the programmable devices 128, the data devices 132, the trusted devices 130, or any other system element.

System 100 comprises one or more computing devices. These one or more computing devices comprise any combination of hardware and software configured to implement the various logical components described herein, including components of the programming unit 110 having the programmer 112, the security controller 114, the adapters, the first security module 116, the second security module 118, and the nth security module 120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The programming unit 110 can be a secure system for programming data, metadata, and code onto the programmable devices 128. The programming unit 110 can receive security information from the security master system 104, process the information, and transfer a properly configured version of the security information to the programmable devices 128.

The programming unit 110 can include the programmer 112. The programmer 112 can be an electromechanical system for physically programming the programmable devices 128. For example, the programmer 112 can receive a tray containing the programmable devices 128, electrically couple the programmable devices 128 to an adapter unit, and transfer security information into the programmable devices 128. The programming unit 110 can receive individualized status information from each of the programmable devices 128 and customize the security information transferred to each of the programmable devices 128 on an individual device basis. For example, each of the programmable devices 128 can receive an individual block of information that is different from the information transferred to others of the programmable devices.

The programmer 112 can be coupled to one or more of the adapters that can be used to access the programmable devices 128. The adapters can include a first adapter 122, a second adapter 124, and a nth adapter 126, In an illustrative example, the first adapter 122 can be a hardware device that can be used to electrically connect one or more of the programmable devices to the programmer 112. The programmer 112 can then transfer a version of the security information to one of the programmable devices 128. The first adapter 122 can include one or more sockets for mounting the programmable devices 128. The first adapter 122 can include a socket, a connector, a zero-insertion-force (ZIF) socket, or a similar device to mounting integrated circuits.

Although the adapters are described as electromechanical units for mounting the programmable devices 128, it is understood that the adapters can have other implementations as well. For example, if the programmable devices 128 are independent electronic devices, such as a cell phone, a consumer electronic device, a circuit board, or a similar device with active components, then the adapters can include mechanisms to communicate with the programmable devices 128. The adapters can include a cable link, a wireless communication link, an electronic data bus interface, or a similar data communication mechanism.

The programmable devices 128 are devices that can be provisioned with secure information by the programming unit 110. For example, the programmable devices 128 can include data devices such as flash memory units, programmable read only memories, secure data storage devices, or similar data devices.

Provisioning may include transferring data and code information to a device. For example, a flash memory unit can be provisioned by programming it with data.

The programmable devices 128 can also include trusted devices 130 that include security data and security programming information. For example, the programmable devices 128 can include trusted devices 130 such as cell phones, hardware security modules, trusted programming modules, circuit board, or similar devices.

The data devices 132 can include any number of devices, e.g., a first data device 134, a second data device 136, and an nth data device 138. The trusted devices 130 can include any number of trusted devices, e.g., a first trusted device 140, a second trusted device 142, and up to an nth trusted device 144.

The programmable devices 128 can each be provisioned with individually customized security information. Thus, each of the programmable devices 128 can include a separate set of the security keys 106 that can be used to individually encrypt the data stored in programmable devices 128. This provides the ability to encrypt security information 148 differently on each of the programmable devices 128 to maximize security. Each of the programmable devices 128 can be personalized with individual security keys 106.

The programmable devices 128 can be configured to include paired devices 146. The paired devices 146 are two or more of the programmable devices 128 that can share one or more of the security keys 106. This can allow each of the paired devices 146 to detect and authenticate another of the paired devices 146 in the same group. Thus, data from one of the paired devices 146 can be shared with another one of the paired devices 146. This can allow functionality such as sharing information, authenticating a bi-directional secure communication channel between two or more of the paired devices 146, identifying other related devices, or a combination thereof.

In an illustrative example, the secure programming system 100 can be used to establish one of the paired devices 146 having the first data device 134, such as a system information module (SIM) chip, paired with the first trusted device 140, such as a smart phone. In this configuration, the first data device 134 and the first trusted device 140 can both be programmed with the security keys 106 for the paired devices 146. Thus, the first trusted device 140 can validate the security information 148, such as a serial number, of the first data device 134 to authenticate that the first trusted device 140 is allowed to use the other information on the first data device 134.

The programming unit 110 can include a security controller 114 coupled to the programmer 112. The security controller 114 is a computing devices for processing security information. The security controller 114 can include specific cryptographic and computational hardware to facility the processing of the cryptographic information. For example, the security controller 114 can include a quantum computer, parallel computing circuitry, field programmable gate arrays (FPGA) configured to process security information, a co-processor, an array logic unit, a microprocessor, or a combination thereof.

The security controller 114 can be a secure device specially configured to prevent unauthorized access to security information at the input, intermediate, or final stages of processing the security information. The security controller 114 can provide a secure execution environment for secure code elements to execute in. For example, the security controller 114 can be a hardware security module (HSM), a microprocessor, a trusted security module (TPM), a dedicated security unit, or a combination thereof. The security controller 114 can be part of the programming unit 110. For example, the security controller 114, such as a hardware security module, can be included within the programmer 112.

The security controller 114 can be coupled to security modules to provide specific security functionality. The security modules can include a first security module 116, a second security module 118, and a nth security module 120. Each of the security modules can provide a specific security functionality such as identification, authentication, encryption, decryption, validation, code signing, data extraction, or a combination thereof. For example, the security modules can be hardware, software, or a combination thereof.

For example, the first security module 116 can be configured to provide an application programming interface (API) to a standardized set of commonly used security functions. In another example, the second security module 118 can be a combination of dedicated hardware and software to provide faster encryption and decryption of data.

The programming unit 110 can include the secure storage of one or more the security keys 106. The security keys 106 can be calculated internal to the secure programming system 100, can be calculated externally and received by the secure programming system 100, or a combination thereof.

The security keys 106 can be used to encrypt and decrypt the security information. The security keys 106 can be used to implement different security methodologies and protocols. For example, the security keys 106 can include key pairs 150 having a private key 152 and a public key 154 for implementing a public key encryption system. In another example, the security keys 106 can be used to implement a different security protocol or methodology. Although the security keys 106 can be described as a public key encryption system, it is understood that the security keys 106 can be used to implement any different security paradigm.

In an illustrative example, the security keys 106 can comprise one or more of the key pairs 150 for a public key encryption system. The security information can be encrypted with the public key 154 of one of the key pairs 150 and can only be decrypted using the paired private key 152.

One of the advantages of the secure programming system 100 includes the ability to provision each of the programmable devices 128 with a different set of the security keys 106 and a different version of the security information 148 encrypted by the individual security keys 106. This can ensure that the security keys 106 used to decrypt the security information 148 on one of the programmable devices 128 cannot be used to decrypt the security information on another one of the programmable devices 128. Each of the programmable devices 128 can have a separate one of the security keys 106 to provide maximum protection.

Figure 2:
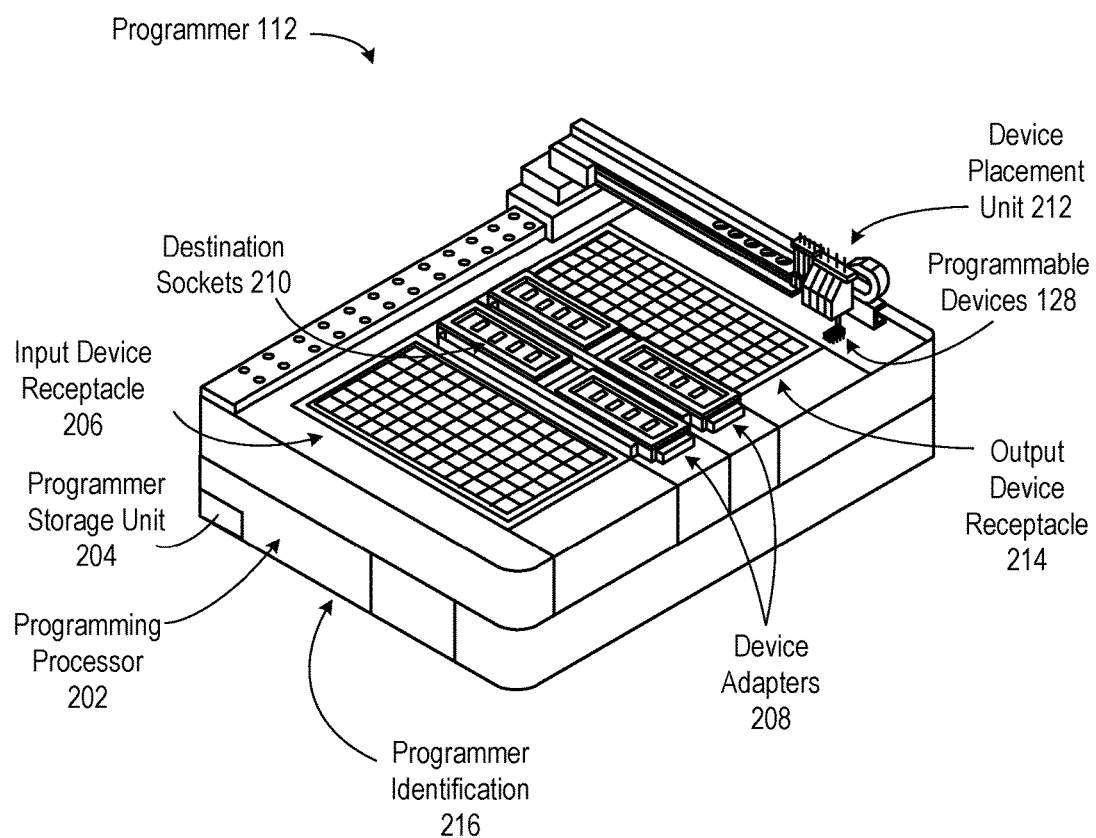
FIG. 2 depicts an example of the programmer.

Referring now to FIG. 2, therein is shown an example of the programmer 112. The programmer 112 is an electromechanical device for provisioning the programmable devices 128.

The programmer 112 can be used to access the programmable devices 128 and provision the programmable devices 128 with the content payload. The content payload can include data, code, security keys 106, the security information 148, and other related content.

The programmer 112 can have a variety of configurations. The programmer 112 can include a programming processor 202, an input device receptacle 206, device adapters 208, destination sockets 210, a device placement unit 212, and an output device receptacle 214. For example, the programmer 112 can be a programmer 112, a chip programmer, a device provisioning system, a circuit board programmer, or a similar provisioning system.

The programmer 112 can have a programmer identification 216. The programmer identification 216 is a unique value for identifying the programmer 112.

The programmer 112 can configure the programmable devices 128 by initializing and writing a data image into the programmable devices 128. The data image can be configured for the device type of the programmable devices 128. The programmer 112 can transfer the data to the programmable devices 128 using direct or indirect memory access.

The programmer 112 can receive a single payload image for the programmable devices 128 and store the image in a local programmer storage unit. The payload image can be processed into individual images targeted for each of the programmable devices 128. Configuring the programmable devices 128 can store memory structure, cryptographic data, and user data on the programmable devices 128. Configuring can include forming one-time structures such as partitions on the programmable devices 128.

The programming processor 202 can have a variety of configurations. For example, the programming processor 202 can include the security controller or be coupled to the system controller. The programming processor 202 can be a single processor, a multiprocessor, a cloud computing element, or a combination thereof.

The programmer storage unit 204 is a device for storing and retrieving information. For example, the programmer storage unit 204 of the programmer 112 can be a disk drive, a solid-state memory, an optical storage device, or a combination thereof.

The programmer 112 can include the software for operating the programmer 204. The software is control information for executing on the programming processor 202. The software can be stored in the programmer storage unit 204 and executed on the programming processor 202.

The programmer 112 can include the input device receptacle 206. The input device receptacle 206 is a source of the programmable devices 128. For example, the input device receptacle 206 can be a tray that conforms to the Joint Electron Device Engineering Council (JEDEC) standards. The input device receptacle 206 can be used for holding unprogrammed devices.

The programmer 112 can include the output device receptacle 214. The output device receptacle 214 is a destination for the programmable devices 128 that have been provisioned. For example, the output device receptacle 214 can be an empty JEDEC tray for holding finished devices, a storage tube, a shipping package, or other similar structure.

The programmer 112 can include the device adapters 208. The device adapters 208 are mechanisms for coupling to the programmable devices 128.

The device adapters 208 can have a variety of configurations. For example, the device adapters 208 can include destination sockets 210 for mounting the programmable devices 128 such as chips. The sockets are mechanisms for holding and interfacing with the programmable devices 128. The device adapters 208 can be modular and removable from the programmer 112 to accommodate different socket configurations. The device adapters 208 can include a latch mechanism (not shown) for attaching to the programmer 112.

The destination sockets 210 can hold the programmable devices 128. The destination sockets 210 can be used to read or write new information to the programmable devices 128.

The programmer 112 can include the device placement unit 212. The device placement unit 212 is a mechanism for positioning the programmable devices 128 in one of the destination sockets 210.

The device placement unit 212 can be implemented in a variety of ways. For example, the device placement unit 212 can be a robotic arm, a pick and place mechanism, or a combination thereof. Although the device placement unit 212 can be described as a rail-based positioning system, it is understood that any system capable of positioning one of the programmable devices 128 in the destination sockets 210 can be used.

The device placement unit 212 can retrieve one or more of the programmable devices 128 that are blank from the input device receptacle 206. The device placement unit 212 can transfer the programmable devices 128 to the destination sockets 210 of the device adapters 208.

Once the programmable devices 128 are engaged and secured by the device adapters 208, the device programming process can begin. The programmer 112 can program a local copy of the information into the programmable devices 128 in one of the destination sockets 210. For example, the local copy of the programming information can be in a preprogrammed master device, from a file in local storage, or from a remote server.

Once programming is complete, the device placement unit 212 can transport the programmable devices 128 that have been programmed to the output device receptacle 214. The device placement unit 212 can transports any of the programmable devices 128 that have errors to a reject bin (not shown).

The programmer 112 can include a programmer identification 216. The programmer identification 216 is a unique value for the programmer 112. The programmer identification 216 can be used to identify the programmer 112. The programmer identification 216 can be incorporated into a device identification of each of the programmable devices 128 to indicate which programmer 112 was used to program the devices.

Figure 3:
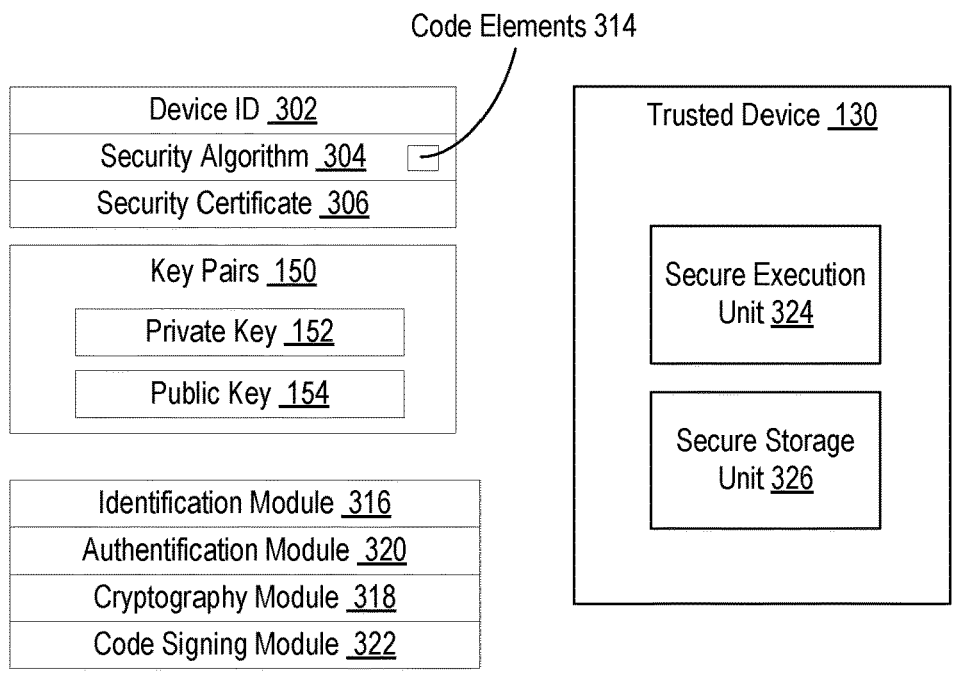
FIG. 3 depicts an example of one of the trusted devices.

Referring now to FIG. 3, therein is shown an example of one of the trusted devices 130. The trusted devices 130 are components having the secure storage unit 326 and the secure execution unit 324. The trusted devices 130 are active components capable of executing secure code in the secure execution unit 324 to perform operations on the secure data in the secure storage unit 326.

The trusted devices 130 can be provisioned by the secure programming system 100 to include security information. For example, the trusted devices 130 can include the device identification 302, security algorithms 304, a security certificate 306 and key pairs 150 each having the private key 152 and the public key 154.

In an illustrative example, the security keys 106 can comprise one or more of the key pairs 150 for a public key encryption system. The security information can be encrypted with the private key 152 of one of the key pairs 150 and decrypted using the public key 154. Similarly, information encrypted using the public key 154 can be decrypted using the private key 152.

The device identification 302 is a data value that can uniquely identify each of the trusted devices 130 individually. For example, the device identification 302 can include serial numbers, markers, security codes, or a combination thereof.

The security algorithms 304 include security code elements 314. The security algorithms 304 can provide an application programming interface to external systems to control security functionality on the trusted devices 130. The security algorithms 304 can be customized to each of the trusted devices 130. For example, the security algorithms 304 can include security code elements 314 such as source code, executable code, a library module, a link module, configuration files, initialization data, hardware control codes, or a combination thereof.

The security certificate 306 is a security object associated with one of the trusted devices 130. The security certificate 306 can be pre-programmed to certify that a device has a particular root of trust embedded in it. The security certificate 306 can have one or more of the public key 154 in them. The security certificate 306 can include security data such as key pairs 150, security keys 106, encrypted passwords, or a combination thereof.

The security certificate 306 can be a securely stored data element. For example, the security certificate 306 can be encrypted security information that may be decrypted before use.

The key pairs 150 can be security element having two or more separate security keys used to encrypt and decrypt data. For example, the key pairs 150 can include the private key 152 and the public key 154. The security information encrypted with the public key 154 can be decrypted using the private key 152.

The key pairs 150 can be implemented in a variety of ways. For example, the key pairs 150 can be configured to have different key lengths to change the level of security. The key pairs 150 can be implemented with different character lengths.

Although the key pairs 150 are described in the context of a public key encryption system, it is understood that the key pairs 150 can also be used to implement any other encryption paradigm. For example, the key pairs 150 can be used for symmetric encryption, asymmetric encryption, standards based encryption, hashing algorithms, or any other encryption system.

The trusted devices 130 can include security functionality implemented as security modules. For example, the trusted devices 130 can include an identification module 316, an authentication module 320, a cryptography module 318, and a code signing module 322.

The identification module 316 can verify the identification of one of the programmable devices 128. The identification module 316 can receive the device identification 302 of one of the programmable devices 128 and determine if the device identification 302 is correct. For example, the device identification 320 can be compared to a list of known devices, compared against a checksum, compared using a computational algorithm, or similar techniques.

The authentication module 320 can verify one or more of the properties of one of the programmable devices 128. The authentication module 320 can receive the device identification 302, the security parameters including one or more of the security keys 106 to determine if the security parameter provided is valid. The authentication module 320 can also be used to validate the device identification 302.

The validity of the security parameter can be determined in a variety of ways. For example, the validity of the security parameter can be validated by successfully decrypting the security parameter using one of the security keys available to one of the trusted devices 130. In another example, the validity of the security parameters can be validated by decrypting one of the security parameters and comparing it to a predefined value stored within one of the trusted devices 130.

The cryptography module 318 is a unit for performing cryptographic operations. The cryptography module 318 can provide an interface to perform computationally intensive such as encryption and decryption. The other security modules can be coupled with the cryptography module 318 to provide security functionality.

The cryptography module 318 can be implemented in a variety of ways. For example, the cryptography module 318 can include hardware, software, or a combination thereof. The cryptography module 318 can provide a standardized interface to allow the other security modules to perform the required cryptographic functions.

The code signing module 322 is a unit for securing code elements 314. The code signing module 322 can encrypt code elements, decrypt code elements, and control the execution of the code elements. The code signing module 322 can be used to ensure that one of the code elements can be executed on one of the trusted devices 130 by verifying that the security information associated with the code element 314.

In an illustrative example, each of the code elements 314 can include an execution parameter that indicates the model number of the trusted devices 130 where the code elements 314 are authorized to execute. The code signing module 322 can be used to validate the execution parameter, compare the parameter to the model number information in one of the trusted devices 130, and only allow execution of the code elements 314 if the two values match. This could be used to limit operation of the code element to a particular high end phone or other specific device.

One of the advantages of the trusted devices 130 is that the trusted devices 130 can identify and authenticate the security information internally to increase the level of security. The trusted devices 130 can validate the security information using the security keys 106 stored in the secure storage unit 326.

The trusted devices 130 can provide a measure of trust when the trusted devices 130 are secure. The trusted devices 130 can have a variety of configurations. For example, the trusted devices 130 can have a system identification, an authentication mechanism, encryption and decryption functionality, code signing to protect executables, trusted storage, and a trusted execution environment.

The system identification can include elements that identify or describe hardware and software components. The trusted devices 130 can have the ability to securely authenticate its identity and other properties. The trusted devices 130 can be able to securely encrypt and decrypt information. The trusted devices 130 can be able to authenticate trusted code. The trusted devices 130 can have secure storage and execution capability.

The secure programming system 100 can be able to implement a system of roots of trust. The roots of trust (RoT) are a set of functions in a trusted computing environment that can establish a trusted operation by the system. For example, the roots of trust can serve as a separate secure compute engine controlling the trusted computing platform cryptographic process. Alternatively, devices can implement the roots of trust as hardware and software components that are inherently trusted. They are secure by design and can be implemented in hardware or protected by hardware. They can be used to perform security critical functions such as measuring or verifying software, protecting cryptographic keys, and performing device authentication.

The roots of trust can provide a variety of security functionality including: on the fly encryption, detection and reporting of tampering with secure data, detection of active tampering attempts, digital rights management, and other similar security functions.

Implementing secure operation in a remote hardware space is difficult because of the higher risk resulting from physical access to the devices. Such secure devices require the hardware to work closely with protected data and software to insure secure operation.

Figure 4:
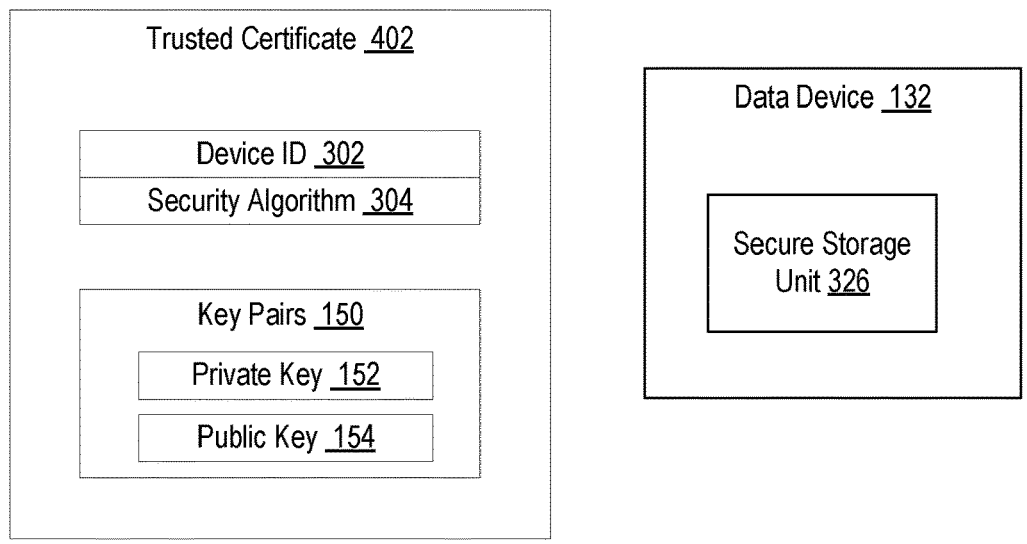
FIG. 4 depicts an example of one of the data devices.

Referring now to FIG. 4, therein is shown an example of one of the data devices 132. The data devices 132 are components having the secure storage unit 326. The data devices 132 are passive components capable storing the secure data in the secure storage unit 326 and providing access to the stored data when accessed by one of the trusted devices 130.

The data devices 132 can be provisioned by the secure programming system 100 to include security information. For example, the data devices 132 can include the device identification 302, the security algorithms 304, the security certificate 306, and the key pairs 150 each having the private key 152 and the public key 154. In this case, the data within the secure storage unit 326 may be internally accessed from within the data devices 132.

The secure storage unit 326 can be used as a write once data area. Information can be programmed into the secure storage unit 326 and then the secure storage unit 326 can be processed to eliminate the access to the data within the secure storage unit 326 from outside the data devices 132.

In an illustrative example, one of the data devices 132 can be a flash memory device. Within the flash memory device, the flash memory can be partitioned into different blocks. Some of the blocks can be used to provide general memory space. Some of the other blocks may be configured to be private and used to store information that is not accessible from outside the flash memory drive. A private block can be used to form the secure storage unit 326.

In another example, the secure storage unit 326 can be a dedicated memory area on one of the data devices 132 that is protected by a security fuse. The data can be written to the secure storage unit 326 and then external access can be eliminated by blowing the security fuse.

Each of the data devices 132 can include a trusted certificate 402. The trusted certificate 402 is a data structure that can include other security parameters. For example, the trusted certificate 402 can include the device identification 302, the security algorithms 304, and the key pairs 150.

Figure 5:
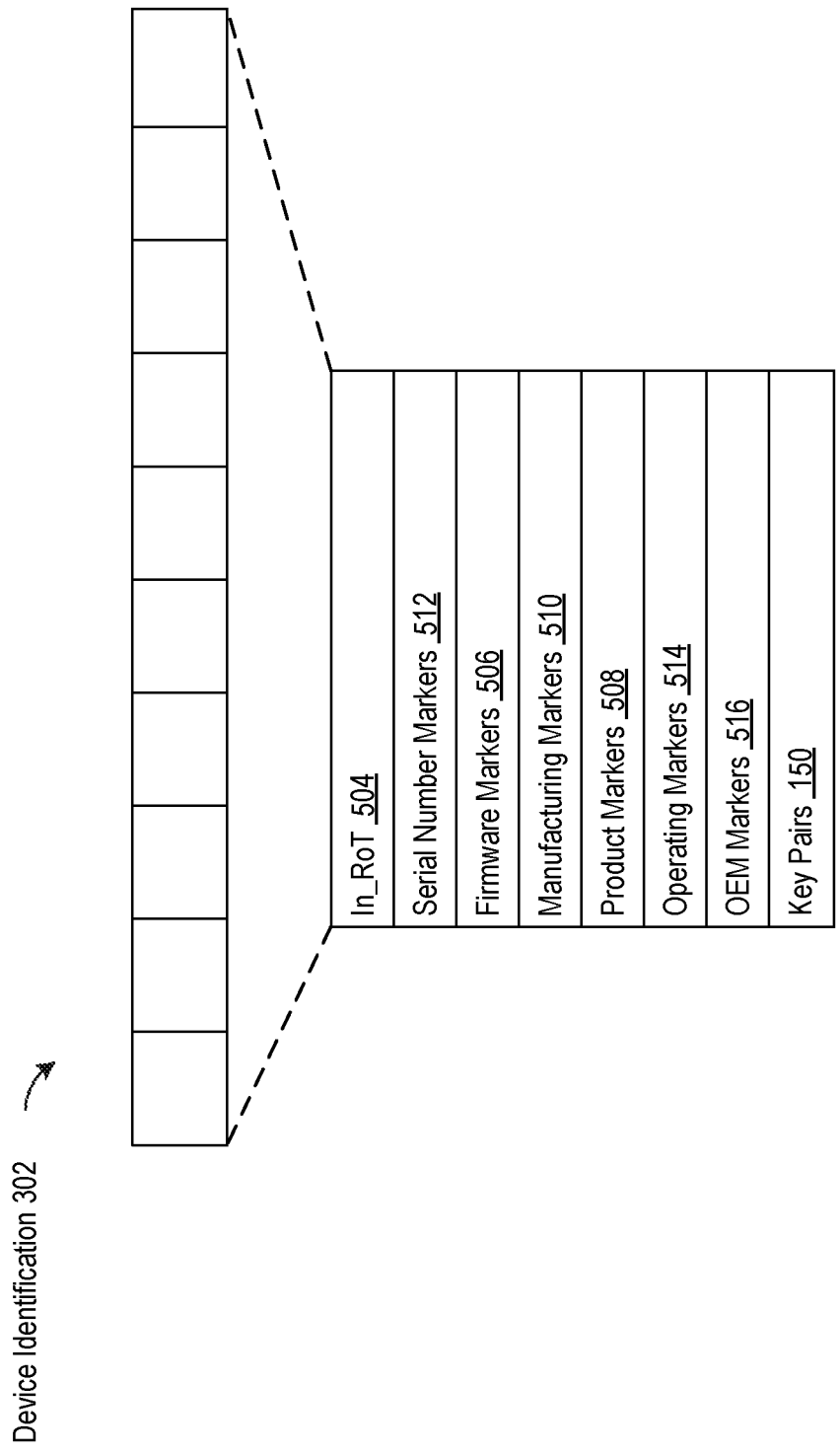
FIG. 5 depicts an example of the device identification.

Referring now to FIG. 5, therein is shown an example of the device identification 302. The device identification 302 is a data structure that can be used to uniquely identify one of the programmable devices 128, the secure programming system 100, the programmer 112, or a combination thereof.

The device identification 302 can have a variety of configurations. For example, the device identification 302 can include an incoming root of trust 504, serial number markers 512, firmware markers 506, manufacturing markers 510, product markers 508, operating markers 514, original equipment manufacturer markers 516 (OEM markers), the key pairs 150, or similar markers.

The incoming root of trust 504 is a security element. The incoming root of trust 504 can be provided form outside one of the programmable devices 128. The incoming root of trust 504 can be implemented in the target device at the time of its manufacture. The incoming root of trust 504 can provide a decryption seed, compatibility range of peripheral components, compatibility device type, firmware qualifiers, manufacturing window (beginning of life (BoL) and end of life (EoL)), other parameters as required, or a combination thereof. The incoming root of trust 504 can modify the interpretation of the other fields in the device identification 302 based on the planned manufacturing structure (bill of materials). The incoming root of trust 504 can specify or restrict the manufacturing structure to verifiable components that meet the criteria of the incoming root of trust 504.

The serial number markers 512 are security elements that can include a serial number for one of the programmable devices 128. The device identification 302 can include one or more of the serial number markers 512. The serial number markers 512 can include a manufacturing date code, a manufacturing lot code, a sequential part identification, a component type code, additional parameters as required, or a combination thereof. The combination of the incoming root of trust 504 and the serial number markers 512 can provide individual identification or range of compatible devices during assembly. The device identification 302 can uniquely qualify a combination of hardware devices within the bill of materials of the next level structure.

The firmware markers 506 are security elements that can describe or identify the version of the firmware used in one of the programmable devices 128. For example, one of the programmable devices 128 can be a circuit board having firmware installed on the board. The firmware markers 506 can identify the version number for each separate firmware element. The firmware version information could be used to coordinate interoperability between code elements in the programmable devices 128. The incoming root of trust 504 can identify the firmware markers 506 that are intended for use in the programmable devices 128. If the incoming root of trust 504 identifies the firmware markers 506 as not included in the intended bill of materials, the programming is not allowed to proceed.

The manufacturing markers 510 are security identifiers that can describe one or more manufacturing properties. For example, one of the programmable devices 128 can include the manufacturing markers 510 such as location information, manufacturing time information, manufacturing location information, time windows, manufacturing execution system identification information, factory identification, vendor identification, manufacturing equipment information, or manufacturing related parameters.

The product markers 508 are security elements that can describe the products used with the programmable devices 128. The product markers 508 can include related manufacturers, branding information, product line information, model information, or other product related parameters.

The operating markers 514 are security elements that can describe the operating properties for the programmable devices 128. The operating markers 514 can include operating voltage, voltage patterns, current levels, power draw, heating factors, critical operating frequencies, operating sequence information, or operating parameters.

The OEM markers 516 are security elements that can describe the original equipment manufacturers or related contract manufacturers who can use the programmable devices 128. The OEM markers 516 can include manufacturer identification 518, license information, time windows, authorized locations, authorized factories, product lot size, serial number ranges, or other OEM related parameters.

The device identification 302 is a multi-variable data structure that includes security information for the programmable devices 128. The data elements of the device identification 302 can be individually encrypted within the device identification 302. The device identification 302 itself can be encrypted. The device identification 302 can be specific to each one of the programmable devices 128 both in terms of the data elements forming the device identification 302 and the degree of encryption and other security mechanisms used to protect the device identification 302.

One of many advantages of the device identification 302 is the enablement of access to specific data elements within the device identification 302 by decrypting only the elements required. By encrypting both the device identification 302 and the individual data elements, a finer granularity of security can be provided. It is understood that the incoming root of trust 504 can be present in each of the programmable devices 128 that are included in the bill of materials. Each of the programmable devices 128 can verify that it is coupled to a certified compatible component based in the incoming root of trust 504 established when it was manufactured. It has been unexpectedly discovered that the device identification 302 can be used to limit the number of devices that can be programmed with a fixed set of the bill of materials. This aspect can prevent pirate production of excess components used without the knowledge or authorization of the original equipment manufacturer (OEM).

Figure 6:
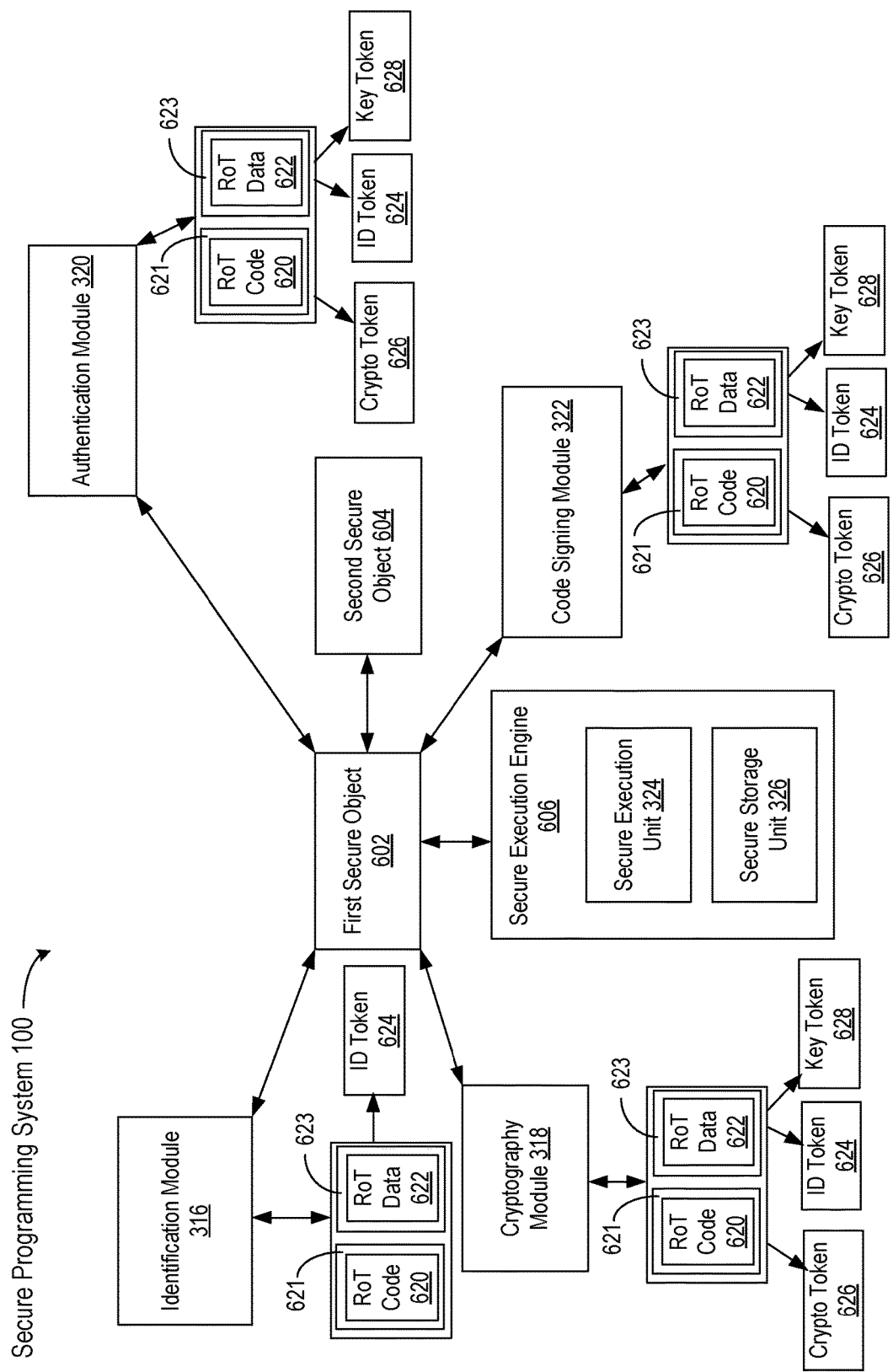
FIG. 6 depicts an example block diagram of the secure programming system.

Referring now to FIG. 6, therein is shown an example block diagram of the secure programming system 100. The secure programming system 100 includes a number of secure objects, such as a first secure object 602 and a second secure object 604. The first secure object 602 may interface or communicate with the second secure object 604.

The secure objects represent any hardware or software objects having security mechanisms or protocols for protection from unauthorized interception or duplication. For example, the secure objects may include, but is not limited to an electronic component, an electronic device, a boot loader, a firmware (FW), an operating system (OS), a software application, a hardware programmer, a peripheral device, a website, a machine, etc.

The first secure object 602 may interface with an identification module 316, an authentication module 320, a cryptography module 318, and a code signing module 322. For illustrative purposes, although the second secure object 604 is shown connected only with the first secure object 602, the second secure object 604 may also be connected with any combination of the identification module 316, the cryptography module 318, the authentication module 320, the code signing module 322. The first secure object 602 or the second secure object 604 is protected from security breach using, but is not limited to, a combination of the identification module 316, the cryptography module 318, the authentication module 320, the code signing module 322, any other units, modules, or functions of the secure programming system 100.

The identification module 316 generates an identity of a secure object to protect the secure object from an unauthorized access to the secure object. The identification module 316 extracts identification tokens 624 (ID tokens). The ID tokens 624 include information that is employed to verify an identity before access to a secure object is granted. The ID tokens 624 may include, but are not limited to, a user identification, a serial number of a device, a device identification, etc.

The ID tokens 624 may be extracted by the identification module 316 using any secure information or mechanism, including, but is not limited to, a root of trust code 620 (RoT code), stored in a RoT code register 621, and a root of trust data 622 (RoT data), stored in a RoT data register 623. The RoT code register 621 and the RoT data register 623 can be volatile memory, non-volatile memory, combinational logic registers, or a combination thereof. For example, the RoT data 622 may represent information associated with a digital birth certificate of a device, a time window for using the root of trust code 620, a range of part numbers or serial numbers allowed for the root of trust code 620, or a combination thereof. The root of trust data 622 can be established during the manufacture and functional testing of the component. By combining the root of trust code 620 with the root of trust data 622, the ID tokens 624 for each of the programmed devices 128 can be generated with no additional components or duplicates of the ID tokens 624.

The term root of trust (RoT) referred to herein refers to a set of functions that can establish a trusted or secured computing module, which includes hardware components, software components, or a combination of hardware and software components. For example, these functions may be implemented in, but are not limited to, a secure boot firmware, a hardware initialization unit, a cross-checking component/chip, etc. Each of the hardware components and software components can only be utilized with the planned and limited number of the programmed devices 128. Also for example, the functions may be implemented using, but is not limited to, a separate compute engine that controls operations of a cryptographic processor. The programmer 112 that is used to write a firmware component into one of the programmed devices can utilize the ID tokens 624 to select the decryption key for the firmware component. An attempt to copy the firmware component to an unauthorized one of the programmed devices 128 may result in an incorrect decryption of the firmware component, which can prevent the programmer 112 from performing the programming operation.

The ID tokens 624 may be decrypted from the RoT code 620 using the RoT data 622. The ID tokens 624 can be cryptographically protected and so may be decrypted only by a coupled version of the RoT code 620. The ID tokens 624 may be unique such that each secure object has its own identification and so none of the secure objects shares its identification with another secure object.

The RoT code 620 includes instructions or commands that are used by a specific hardware set to decipher data that may be used to identify a source of a device or to decode content. The RoT data 622 includes information that is protected and may only be decoded using a coupled set of the RoT code 620. The RoT code 620 can be generated to only operate with a limited range of the programmed devices 128 having the appropriate the RoT data 622. This combination can concurrently verify the correct firmware component is being applied to the correct hardware device and verify that only the planned number of the programmed devices 128 get generated.

The RoT code 620 and RoT data 622 may be provided or generated by any secure mechanism of the original manufacturer. For example, the RoT data 622 can be established when the device is manufactured and the RoT code 620 can be programmed into a secure storage area of a device during programming or configuring the device. The RoT code 620 can be generated to control the specific use and number of occurrences of the programmed devices 128.

Also for example, the RoT code 620 and RoT data 622 may be sent from a host server or system to the secure programming system 100 in a secure manner such that only the secure programming system 100, which has been authorized and validated to receive the RoT code 620 and RoT data 622. Further, for example, the host server or system may include the security master system 104 that sends the security keys 106 to the secure programming system 100 for identification or authentication before the secure programming system 100 may be able to receive or decrypt information from the security master system 104.

As an example, the secure storage area may include, but is not limited to, a one-time programmable memory or any other storage areas that are known only to authorized users or devices. As another example, the secure storage area may include, but is not limited to, a storage or memory that is accessible only with authorized information or identification without which permission would be denied.

For example, the RoT code 620 may be preprogrammed into a device, such as the secure objects having the RoT data 622, at the time when the programmed device 128 is configured and before the programmed device 128 is integrated or operated in a production environment or system. The RoT code 620 can enable the programmed device 128 to identify which other devices can be coupled to its interface. This can adhere to the planned build schedule with no possibility of generating excess, pirate components. Also, for example, the production environment or system may include, but is not limited to, a portable device, a computer, a server, an electronic circuit board, etc.

The authentication module 320 is a unit that is employed to verify whether an identification token 624 is authorized for access to a secure object. After the identification module 316 extracts the ID tokens 624, the authentication module 320 verifies the ID tokens 624 to identify whether a secure object is a valid object that may communicate with an authorized system to send or receive secure information. For example, if one of the ID tokens 624 is not valid, the secure object may not be allowed to exchange information with the programmer 112.

After the authentication module 320 verifies that the ID tokens 624 of the secure object is valid, the authentication module 320 may generate a combination of one of the ID tokens 624, a key token 628, and a cryptographic token 626. The key token 628 includes information employed for authentication of the ID tokens 624. The cryptographic token 626 includes information employed for cryptographically encode or decode information for information security or data confidentiality. By way of an example, the programmer 112 can transfer an encrypted file to the secure object 602, which can use the key token 628 to access the cryptographic token 626 in order to unpack and decode the software that is to be programmed into the secure device 602.

In one or more embodiments, the ID tokens 624, the key token 628, or the cryptographic token 626 may be generated from the RoT data 622 using the RoT code 620. In one or more embodiments, the ID tokens 624, the key token 628, or the cryptographic token 626 may be cryptographically protected and so may be decrypted only by the correct version of the RoT code 620.

The cryptography module 318 provides data encryption and decryption for secure information exchanged to the secure object 602 or between the secure object 602 and an external system. The external system that may exchange the secure information with the secure object 602 may include, but is not limited to, the programmer 112, the security master system 104, a host system, etc.

In an embodiment, after the identification module 316 extracts the ID tokens 624 or the authentication module 320 validates the ID tokens 624, the cryptography module 318 may generate the ID tokens 624, the key token 628, and the cryptographic token 626. The cryptographic token 626 may be generated by the cryptography module 318 using the RoT data 622 to decode information from the RoT code 620.

In an embodiment, the cryptography module 318 may generate the ID tokens 624 or the key token 628 using the cryptographic token 626 to further decode other information from the RoT code 620. In an embodiment, elimination of data breach is greatly simplified using the cryptography module 318 having multiple levels of protection that improve information security or data confidentiality.

In an embodiment, the cryptography module 318 may include cryptography methods including, but is not limited to, symmetric-key cryptography, public-key cryptography, etc. For example, the cryptography module 318 may include a cryptographic method in which both sender and receiver may share the same key or different keys that may be computed using a predetermined algorithm established in the RoT data 622.

As an example, the cryptographic method may include, but is not limited to, block cipher methods, cryptographic hash functions, etc. As another example, the cryptographic method may include, but is not limited to, Data Encryption Standard (DES), Advanced Encryption Standard (AES), triple-DES, MD4 message-digest algorithm, MD5 algorithm, Secure Hash Algorithms 1 and 2, or any advanced encryption technique to be developed.

As an example, the cryptographic method may include, but is not limited to, a public-key or an asymmetric key cryptography in which two different but mathematically related keys may be used—a public key and a private key. As another example, a public key system may be constructed so that calculation of one key (e.g., a private key) may be computationally infeasible from the other key (e.g., a public key), even though they are related. Both public and private keys may be generated secretly as an interrelated pair. As an example, the RoT data 622 can provide a conversion seed to generate the private key within the secure device 602.

For example, in public-key cryptosystems, a public key may be freely distributed, while its paired private key may remain secret. In a public-key encryption system, a public key may be used for encryption, while a private or secret key may be used for decryption.

The code signing module 322 verifies the integrity of code information exchanged between systems or devices. The code signing module 322 verifies whether content of exchanged information has been altered or tampered with.

For example, the code signing module 322 may include a process of digitally signing executables or scripts to confirm a software author or generator and validates that an executable code or script has not been altered or corrupted. Also for example, a code may be verified as altered or corrupted since it was signed by way of, but is not limited to, a cryptographic hash, checksum, etc.

In an embodiment, after the identification module 316 extracts the ID tokens 624 or the authentication module 320 validates the ID tokens 624, the code signing module 322 may generate the ID tokens 624, the key token 628, and the cryptographic token 626. The cryptographic token 626 may be generated by the code signing module 322 using the RoT data 622 to decode information from the RoT code 620.

In an embodiment, the code signing module 322 may generate the ID tokens 624 or the key token 628 using the cryptographic token 626 to further decode other information from the RoT code 620. In an embodiment, elimination of data breach is greatly simplified using the code signing module 322 having multiple levels of protection that improve information security or data confidentiality.

A secure object, such as the first secure object 602 or a second secure object 604, may interface with a secure execution engine 606. The secure execution engine 606 includes a mechanism that manages or controls programming of the secure object. The secure execution engine 606 includes a secure execution unit 324 and a secure storage unit 326.

The secure execution unit 324 is a block that executes codes or computer instructions in a protected environment. The environment in which the secure execution unit 324 operates may create a flexible, scalable solution to problems of creating a large-scale, wide-area secure environment in which only trusted, authenticated application code can operate. The secure execution unit 324 may enable the programmer 112 and the secure objects to work together in a secure environment.

The secure execution unit 324 may execute trusted codes that have been stored by the secure storage unit 326 when the secure objects were previously programmed, configured, tested, or certified before the secure objects operate in an end-user production environment. The trusted codes executed by the secure execution unit 324 may be signed and authenticated.

The secure storage unit 326 stores and provides trusted codes for the secure execution unit 324 to execute. In an embodiment, secure environment is greatly simplified using the secure execution engine 606 that stores program codes in the secure storage unit 326 and executes the program codes using the secure execution unit 324, thereby providing an additional level of protection against data breach.

For example, the trusted codes may be previously stored in a secure storage or memory area of the secure objects when the secure objects were previously programmed, configured, tested, or certified. Also for example, the trusted codes may be decoded by the cryptography module 318 using information sent from the programmer 112 to the secure objects.

Figure 7:
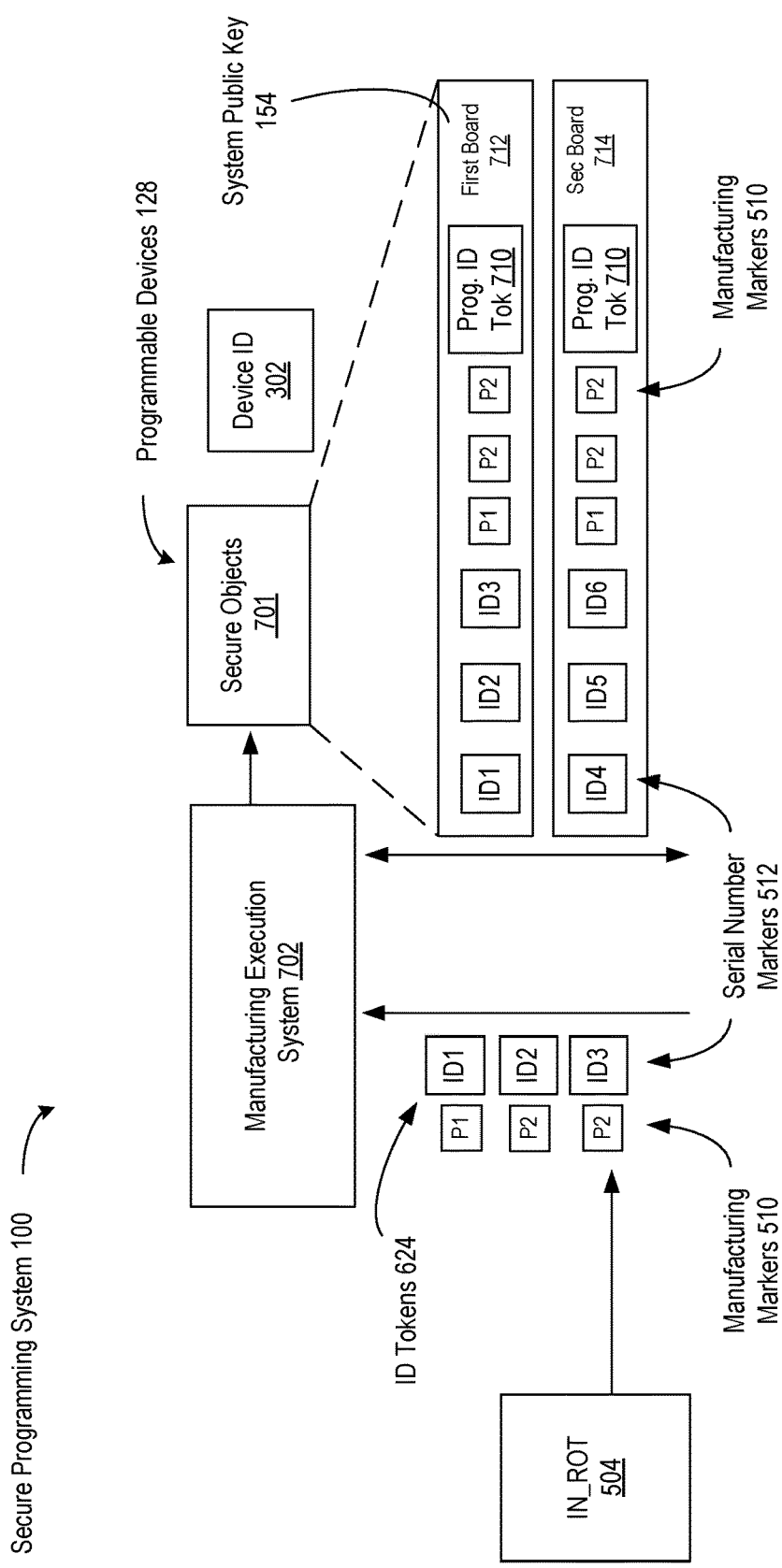
FIG. 7 depicts a second example block diagram of the secure programming system.

Referring now to FIG. 7, therein is shown a second example block diagram of the secure programming system 100. The example diagram shows a data flow of secure information during programming of the secure objects 701.

For example, the identification tokens 624, depicted as ID1, ID2, and ID3, may include serial number markers 512 of the secure objects 701. The serial number markers 512 are unique information assigned to each of the secure objects 701. The serial number markers 512 of a secure object can be different from another of the serial number markers 512 of another secure object such that there may not be two secure objects 701 share the same serial number marker 512. The serial number markers 512 may be generated by the programmer 112. Each serial number marker 512 may be assigned to each secure object by the programmer 112.

An incoming root of trust 504 (In_RoT) may include, but is not limited to a programmer identification 216. The In_RoT 504, denoted as In_RoT 504, includes information that have been previously programmed or configured prior to programming the secure objects 701. In one or more embodiments, the previously programmed information may have been programmed into a combination of adapters for programming the secure objects 701, the programmer 112, and the secure objects 701. By way of an example, the In_RoT 504 can be a secure loaded, a decryption engine, an interface device definition (bill of materials coupling), or a combination thereof.

The In_RoT 504 may be separate or different from the ID tokens 624. The In_RoT 504 may include information previously programed that is different from information to be programmed into the secure objects 701. The ID tokens 624 can define the next level destination of the programmed devices 128 as part of the manufacturing planned build.

For example, the In_RoT 504 may include, but is not limited to, serial numbers or unique keys that were embedded or programmed into components at the time of manufacturing the components. Also for example, the time of manufacturing the components may be, but is not limited to, a time when the components were manufactured at silicon level or a system level prior to programming the components.

In one or more embodiments, the In_RoT 504 may be ingested or input by a manufacturing execution system 702 (MES). The manufacturing execution system 702 can be performing a build plan to fabricate a first board 712 and a second board 714. It is understood that any number of the boards can be manufactured by the manufacturing execution system 702. The In_RoT 504 may be combined with a programmer generated unique RoT, such as the ID tokens 624, to generate a unique system-level RoT. The In_RoT 504 may include information from a digital birth certificate that has been previously programmed into a component during the manufacture of the component. By way of an example, the digital birth certificate can include the RoT data 622 and the RoT code 620.

The In_RoT 504 may include any number of manufacturing markers 510, denoted as P1 and P2. The manufacturing markers 510 include information associated with components when the components are manufactured. For example, the manufacturing markers 510 may include, but is not limited to, a component ID, a programmer ID, a location of manufacture of a component, a date code, and a time of manufacture of a component, etc.

The manufacturing execution system 702 is a computerized system used in manufacturing for product quality control purposes. The MES 702 may track and document transformation of raw materials to finished goods. The MES 702 may provide information about how current conditions on a plant floor can be optimized to improve production output. The MES 702 work in real time to enable control of multiple elements of a production process (e.g., inputs, personnel, machines, support services, etc.).

In one or more embodiments, the MES 702 may receive the In_RoT 504 along with the ID tokens 624 to program the programmable devices 128, such as secure objects 701. The In_RoT 504 and the ID tokens 624 may be used to generate the device identification 302 of a secure object. The device identification 302 includes information that is unique and associated with only one device or secure object.

The device identification 302 may include unique information that may be programmed into a system, such as the first board 712 or the second board 714. The first board 712 and the second board 714 are board-level systems with a number of the secure objects 701 assembled and connected with each other in the systems.

The first board 712 may include a system public key 154 for cryptography. The system public key 154 may be implemented in the first board 712 for a public key encryption system. The system public key 154 may be part of one of the key pairs 150. Security information may be encrypted by a secure object using the private key 152 of one of the key pairs 150 and decrypted by the first board 712 using the system public key 154.

The first board 712 may use the system public key 154 to encrypt secure information and send to a secure object, which may decrypt the encrypted information using the private key 152. Although the system public key 154 is described for the first board 712, it is understood that a system public key may be implemented in the second board 714 as well.

The secure programming system 100 illustrates only one of many possible arrangements of components configured to provide the functionality described herein. Other arrangements may include fewer, additional, or different components, and the division of work between the components may vary depending on the arrangement. For example, in some embodiments, some of the security modules may be omitted, along with any other components relied upon exclusively by the omitted component(s). As another example, in an embodiment, system 100 may further include multiple serial numbers or other system identifiers.

Figure 8:
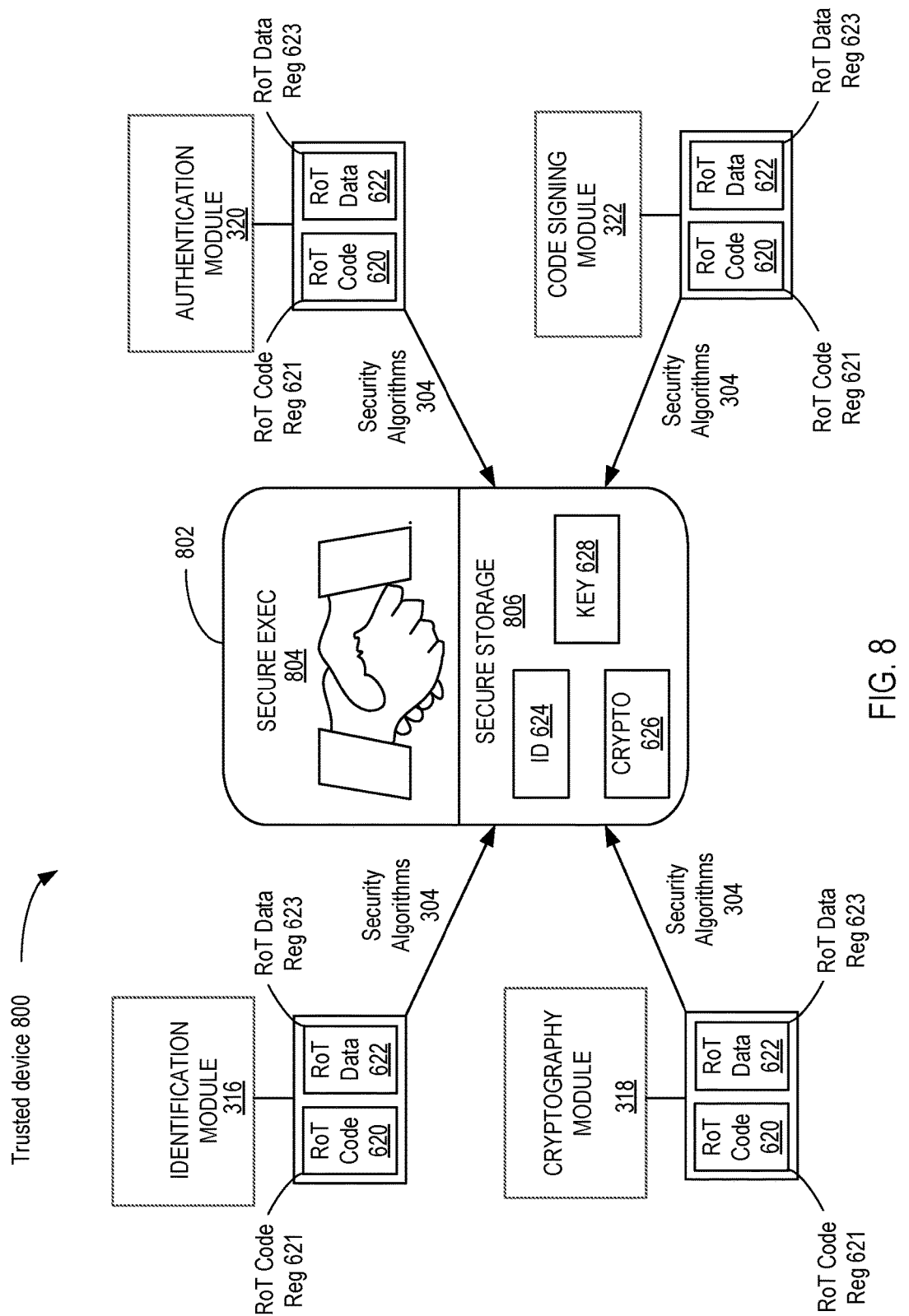
FIG. 8 is a block diagram of a trusted device according to an embodiment.

Referring now to FIG. 8, therein is shown a block diagram of a trusted device 800 according to an embodiment. The various elements of the trusted device 800 may be performed in a variety of systems, including systems such as the secure programming system 100 described above. In an embodiment, a trusted hardware platform 802 can be assembled to include a secure execution module 804 that can interface with a secure storage module 806.

During the manufacturing of the trusted hardware platform 802, the manufacturing execution system 702 can work to a predefined build plan requiring each of the programmed devices 128 to include the ID token 624 as required by the build plan. The inclusion of the RoT data 622 and the RoT code 620 can produce exactly the correct number of the programmed devices 128 including the ID token 624 required to fulfill the manufacturing execution system 702.

The identification module 316 can produce the ID tokens 624 by generating the RoT code 620 matching the RoT data 622 as required for the manufacturing execution system 702. The cryptographic token 626 and the key token 628 can be generated by the cryptography module 318 utilizing the RoT code 620 and the RoT data 622. It is understood that the RoT data 622 can be designed into the electronic device when it is manufactured and can be configured with the RoT code 620 when it is prepared to be submitted to the manufacturing execution system 702. Each subsystem level of the trusted hardware platform 802 can include the ID token 624, the cryptographic token 626, and the key token 628. The ID token 624, the cryptographic token 626, and the key token 628 can be utilized when the operating firmware of the trusted hardware platform 802 can be updated.

The authentication module 320 can utilize the RoT code 620 and the RoT data 622 to verify the trusted hardware platform 802 is actually a certified component and not a pirated device. Once a new firmware is loaded, the code signing module 322 can verify that the firmware has not been altered or tampered with prior to decrypting and loading the code for controlling the operation of the trusted hardware platform 802.

It is understood that the trusted hardware platform 802 can maintain the security and integrity of the hardware and software utilized to execute the manufacturing execution system 702 without compromising any of the hardware components or software components used to produce the trusted hardware platform 802. It is further understood that the assembly of the programmable devices, on a subsystem or board, by the previously discussed methods can transform the subsystem to the trusted hardware platform 802.

A particular embodiment of the RoT code 620 and the RoT data 622 can be instantiated in the trusted hardware platform 802. The RoT data 622 and the RoT code 620 can configure a secure application programming interface (API) for execution by the trusted hardware platform 802. The exposure of the secure API to the trusted hardware platform 802 for execution can assure the secure programming of the RoT data 622 in a secure environment.

The secure API can be related to a code of a particular RoT that is programmed into a device by the security algorithms 304. A code RoT functionality can be exposed to firmware (on a device) through an API mechanism. For example, an entry point of a code RoT can be an API function. The secure API can be run or executed on a device.

The security algorithms 304 can be used to program security related RoTs. The security algorithms 304 can be executed on the programmer 112 or the security controller 114 of the programming unit 110. The security algorithms 304 can be related to all or at least a number of programming steps that the programming unit 110 executes to program data and code associated with a RoT into a device.

It has been discovered that the RoT code 620 and the RoT data 622 can be customized to enable the selective programming for a specific type and number of the trusted hardware platform 802. The RoT code 620 and the RoT data 622 can provide the security algorithms 304 for a single device or thousands of devices serviced by the trusted hardware platform 702. The security algorithms 304 provide the abstracted interface on the programming unit 110 that allows the rest of the security information to be written to the programmable devices 128. For example, the security algorithms 304 can be customized for programming applications that are FLASH specific, EEPROM specific, HSM specific, iPhone specific, etc. Basically, the security algorithms 304 can support a single device type and perform the specific programming tasks. The security algorithms 304 can write to a specific block in a flash memory for secure information or trip security fuses, under a secure programming environment.

The security algorithms 304 simplify Security Programming by abstracting away the complexity of mapping the key security use cases to a system. This makes embedding of these secure API's into devices through the security algorithms 304 that can be customized on a device by device basis. A new paradigm can be provided by the security algorithms 304 for programming proprietary code into individual devices while preventing unauthorized access to the proprietary code resources. The security algorithms 304 represented by the secure API can simplify the manufacturing process, protect proprietary code, and prevent piracy by blocking programming of unauthorized devices.

The security algorithms 304 can be customized to provide specific support for storing Data and Code for each RoT in Secure Storage of the target device. The security algorithms 304 can also configure data and code to run in secure execution based on the secure execution features of a device. The security algorithms 304 expose the secure API interface to firmware for proprietary execution.

Figure 9:
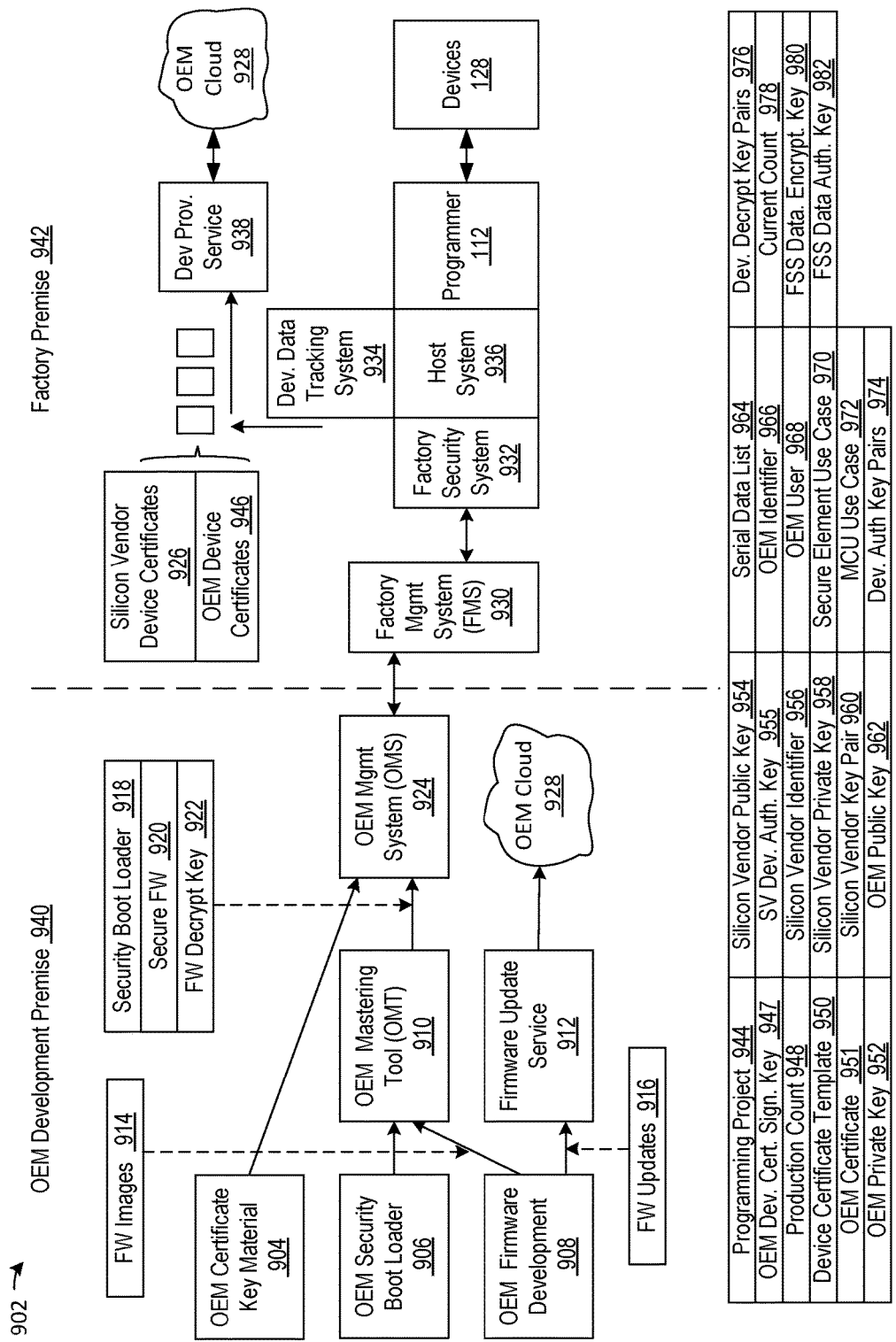
FIG. 9 is an example of a managed and security processing system.

Referring now to FIG. 9, therein is shown an example of a managed and security processing system 902 (MSP system). The MSP system 902 can securely deploy and provision the programmable devices 128.

The MSP system 902 can individually configure data devices and active, trusted devices with cryptographic information to provide a secure programming and operation environment. The MSP system 902 can allow the secure programming of the programmable devices 128 at a secure original equipment manufacturer (OEM) site.

The MSP system 902 can be one of the embodiments of the secure programming system 100. The elements of the MSP system 902 can be implemented using the element of the secure programming system 100.

The MSP system 902 can support the operation of the system distributed in part across multiple locations or premises. The MSP system 902 can include an OEM development premise 940 and a factory premise 942. The OEM development premise 940 can be used to prepare for the actual programming and provisioning of the programmable devices 128. The OEM development premise 940 can be used to prepare programming information for multiple factories. The OEM development premise 940 is a location where an OEM can prepare the programming project 944 having the information for configuring a set of secure devices, such as the programmable devices 128, secure elements, trusted devices 130, or other similar devices.

Although there are differences between the different types of secure devices, the terms are generally understood to be interchangeable and are general in nature. The secure devices, secure elements, programmable devices 128, trusted devices 130, and other similar elements can be used interchangeably in this description for convenience and brevity.

The OEM development premise 940 can take firmware images 914 that are used to provision the programmable devices 128 and prepare the programming project 944. The programming project 944 can then be securely transferred to the factory premise 942 and used to control the programming of the programmable devices 128.

The OEM development premise 940 can have a set of secure manufacturing systems and data stores for facilitating creating the programming project 944. For example, the OEM development premise 940 can include OEM Key Material 904, an OEM Security boot loader 906, the OEM firmware development system 908, an OEM mastering tool 910, a Firmware Update Service 912, and an OEM Management system 924.

The factory premise 942 is a location for programming and provisioning the programmable devices 128. The factory premise 942 can be a programming center, a fabrication facility, a contract manufacturer site, or a similar location. In an embodiment, the factory premise 942 is where the programmer 112 and the programmable devices 128 are locate and operated.

The MSP system 902 can include a security boot loader 918. The security boot loader 918 is the secure programming code that can be executed at boot time on the programmable devices 128 to insure compliance with the security protocols. The OEM security boot loader 906 creates device identity, creates the ability to accept an encrypted data stream and de-crypt on-device and initializes a secure run time environment on the device so that firmware can run securely on the device.

The MSP system 902 can also include secure firmware 920. The secure firmware 920 is software code and data to be embedded in non-volatile memory of the programmable devices 128. The secure firmware 920 can be transferred in an encrypted state and decrypted at the programmer 112.

The MSP system 902 can include a firmware decrypt key 922. The firmware decrypt key 922 can be used to decrypt the secure firmware 920 that has been encrypted using the encryption key related to the firmware decrypt key 922. For example, the firmware decrypt key and the encryption key can be part of a symmetric key pair used for encryption.

The MSP system 902 can include firmware images 914 from the OEM. The firmware images 914 are embedded application code that will be loaded by OEM security boot loader 906 and run on the programmable devices 128 during and after manufacturing.

The MSP system 902 can include the OEM key material 904. The OEM key material 904 can include information such as a silicon vendor device authentication key 955, an OEM device certificate signature key 947 required to sign an OEM device certificate 946, and an OEM device certificate template 950.

The OEM certificate template 950 is a block of information used to form the OEM certificate 951. It includes the basic required information for the OEM certificate 951. The OEM certificate 951 is a block of information that defines an OEM user 968. The OEM certificate 951 can include an OEM identifier 966, an OEM public key 962 and an OEM private key 952. The OEM identifier 966 is a value that uniquely identifies the OEM.

A silicon vendor is an entity that can manufacture or provide the programmable devices 128. The silicon vendor can be identified with a silicon vendor identifier 956. The silicon vendor identifier 956 is a value linked to the silicon vendor. For example, the silicon vendor identifier 956 can be linked to the company that actually makes the integrated circuits or components that form the programmable devices 128. The silicon vendor can also be a company that pre-configures the programmable devices 128 before delivering them for programming by the system.

The MSP system 902 can include a OEM firmware development system 908. The firmware development system 908 supports the development of firmware images 914 for deployment to the programmable devices 128.

The MSP system 902 can include the OEM Mastering Tool 910 (OMT). The OEM mastering tool 910 is a security application or system that can bind the OEM security boot loader 906 to the firmware images 914. The OEM mastering tool 910 can sign and encrypt the firmware images 914 and prepare the firmware images 914 for field updates. The field upgrades can allow the firmware deployed in the programmable devices 128 to be changed remotely in a secure fashion. The OEM mastering tool 910 can product the secure firmware 920 by encrypting the firmware images 914 using the firmware decrypt key 922. The OEM mastering tool 910 can include a HSM or TSM and be implemented in hardware or software.

The MPS system 902 can include an OEM management system 924. The OEM management system 924 is a system for defining a programming project 944 for an OEM user. The programming project 944 is an information package that defines a secure production run of the programmable devices 128.

The OEM management system 924 can bind the OEM Security Boot Loader 906, the firmware images 914, the OEM certificate 951, the OEM key materials 904, and a production count 948 to the programming project 944. Once the programming project 944 is initially created, the programming project 944 can updated to include the references, code, and data of the OEM security boot loader 906, the firmware images 914, the OEM key materials 904, the OEM certificate 951, and the production count 948. The binding process means that the information is part of the parameters of the programming project 944. The OEM management system 924 can also bind the programming project 944 to a specific security programming system at the factory premise 942. The programming project 944 can include the system identification 814 of a programming system or subsystem such as the secure programming system 100, the programming unit 110, the programmer 112, or a combination thereof. Then the programming project 944 can only be performed on a system having the system identification 814.

The production count 948 is an indicator describing the number of secure devices to be produced in the production run. The production count 948 can be compared to an incrementing number that is updated when a secure device begins or completes production. The programmer 112 receiving the programming project 944 can use the production count 948 to limit the number of devices programmed and provisioned to prevent unauthorized production of the programmable devices 128. During production, a current count 978 can indicate the current number of the products that have been produced. The system can stop programming the devices by comparing the current count 978 to the production count 948 and stopping when the current count 978 is equal to the production count 948.

The OEM management system 924 can be configured in a variety of ways. For example, the OEM management system 944 can be implemented in a shared configuration and generate the programming project 944 for deployment to multiple OEMs each having their own factory, such as the factory premise 942. The OEM management system 924 can be implemented using the secure master storage system 102, the security master system 104, the secure programming system 100, or a combination of systems and subsystems thereof.

The MSP system 902 can include a factory management system 930. The factory management system 930 is a system for managing the secure programming components at the factory premise 942. The factory management system 930 can receive the programming project 944 from the OEM management system 944 and the decrypt and distribute the manufacturing information to the other security and programming systems located at the factory premise 942.

The factory management system 930 can be implemented in a variety of ways. For example, the factory management system 930 can be implemented with the manufacturing execution system 702, the programming processor 202, the host computer system, or another similar processing system.

The MSP system 902 can include a factory security system 932. The factory security system is an HSM based security appliance that generates keys and certificates to be programmed into the programmable devices 128. The factory security system 932 can support a multi-tenant OEM architecture by isolating the security information of one OEM from that of another. This allows the factory security system 932 to program and provision different sets of the programmable devices 128 for different OEMs in different programmers.

The factory security system 932 can be configured in a variety of ways. For example, the factory security system 932 can be implemented using the security master system 104, the security controller 114, the programming processor 202, the first security module 116, the second security module 118, the nth security module 120, or a combination thereof. The factory security system 932 can be implemented in a centralized or distributed fashion using one or multiple security components in the MSP system 902.

The factory security system 932 can provide high security encryption services including key pair generation, encryption, decryption, certificate management, secure storage, secure execution, and other similar security processing features. The factory security system 932 can also support secure development, secure mastering, secure deployment of data and code, secure provisioning, secure programming, and secure updates.

The factory security system 932 can perform device authentication based on-device certificates, deployment management and versioning, digital lifecycle management, and application management. The factory security system 932 can provide symmetric encryption, hash functions, data encapsulation, digital signatures, key agreement and transport, key management, and user access control.

The factory security system 932 can include a factory security system certificate 933 for authenticating the identity of the factory security system 932. The factory security system certificate 933 can be used to sign information transferred from the OEM development premise 940 and the OEM management system 924 to the factory management system 930 and the factory security system 936. The factory security system 932 can include a factory security system data encryption key 980 and a factory security system data authentication key 982. The keys can be used to securely encrypt, decrypt, sign, and authenticate secure information.

The MSP system 902 can include a host system 936 at the factory premise 942. The host system 936 is a computer system for controlling the execution of the programming project 944 and managing the communication between the programmer 112 and Factory security system 932.

The host system 936 can be implemented in a variety of ways. For example, the host system 936 can be implemented using the security controller 114, the programming processor 202, or another similar computing system coupled to the secure processing system 100. The host system 936 can be coupled to the factory security system 932, the programmer 112, the factory management system 930, or other similar systems.

The MSP system 902 can include the programmer 112 for programming the programmable devices 128. The programmer 112 can receive a set of blank or partially programmed devices and securely program the programmable devices 128 with the information from the programming project 944.

The programmer 112 can create serial data lists 964 for programming the programmable devices 128. The serial data lists 964 are lists of device specific data to be programmed into the programmable devices 128. This can include the firmware images 914, the OEM device certificate 946, code, data, or other information. The serial data lists 964 can vary based on the individual device information, such as serial numbers, device identification, data certificates, or similar device specific parameters.

The MSP system 902 can include device certificates to protect the programmable devices 128. The device certificates can include silicon vendor device certificates 926, original equipment manufacturer device certificates 946 (OEM device certificates 946), or other device certificates. The device certificates can include information about the programmable devices 128 including public keys, the device identification 302, a silicon vendor identifier 956, the OEM identifier 966, or other similar information.

The silicon vendor device certificate 926 is set of data elements that securely define the identity of one of the secure elements, such as the programmable devices 128 or trusted device 130. The silicon vendor device certificate 926 can include the device identification 302, a silicon vendor public key 954, and/or other security information. Information encrypted by a silicon vendor private key 958 can be decrypted using the silicon vendor public key 954 of a silicon vendor key pair 960.

The silicon vendor device certificate 926 can be programmed into a secure storage unit of the secure element by the silicon vendor or manufacturer before the secure elements are transferred to other manufacturers or users. The silicon vendor device certificate 926 can be stored in a write-once secure storage unit where additional information may be added to the silicon vendor device certificate 926, but existing information cannot be erased or modified. Portions of the secure storage unit can be locked when no further changes are required. The secure storage unit can include one or more data elements, such as multiple device certificates and other related security data.

The silicon vendor device certificates 926 can be implemented in a variety of ways. For example, the silicon vendor device certificates 926 can be implemented using the manufacturing markers 510, the security certificate 306, the security algorithm 304, the product markers 508, the operating markers 514, the incoming root of trust 504, the trusted certificate 402, or another similar data element.

The MSP system 902 can include a device data tracking system 934 for providing device level programming statistics in real time. The device data tracking system 934 can track device level information for the secure programming system 100 in the local factory or for devices being provisioned remotely. The device data tracking system 934 can track device level information for each of the programmable devices 128 configured by the programmer 112 in the MSP system 902. The device data tracking system 934 can track data such as the silicon vendor device certificates 926, the system identification 814, the device identification 302, or other data elements that have been programmed into devices. The device data tracking system 934 can track device status including validity status, configuration status, duplicate status, or other device level status.

The MSP system 902 can include a device provisioning service 938. The device provisioning service 938 is a system for provisioning the programmable devices 128 over the Internet. The device provisioning service 938 can be a combination of hardware and software that can securely deliver provisioning information to the programmable devices 128 in the field. The device provisioning service 938 can distribute security information, data updates, software updates, and other security and operational information needed for continued secure operation of the devices.

The MSP system 902 can include a firmware update service 912. The firmware update service 912 is a system for updating the firmware of the programmable devices 128 over the Internet, such as an OEM cloud 928. The firmware update service 912 can securely deliver firmware updates 916 to a system having one or more of the programmable devices 128 and update the programmable devices 128 with the new firmware. The firmware updates 916 are software and data packages used to update the firmware in the programmable devices 128. The firmware update service 912 can be part of a system having security software and hardware that can deploy the firmware updates 916 and associated security information to ensure the programmable devices 128 are updated securely.

The MSP system 902 can be operated in a variety of ways. In an illustrative example, the MSP system 902 can be operated based on a secure element use case 970. The secure element use case 970 can describe one way to use the MSP system 902 to securely program the programmable devices 128 where the programmable devices 128 are already configured with firmware and have the silicon vendor device certificate 926 pre-installed at the silicon vendor facility.

The secure element use case 970 can include two major steps. In step 1, the silicon vendor device certificate 926 is extracted from one of the programmable devices 128 and the device is authenticated. In step 2, the OEM device certificate 946 is created based on the silicon vendor device certificate 926 of the authenticated device. Then the OEM device certificate 946 is programmed into the device.

In this use case, an HSM-based security system, such as the factory security system 932, can be integrated as part of the secure programming system, such as a system for programming secure microcontroller units with integrated security areas. The integrated security areas can be protected areas of memory that can be written once and not changed. This allows the non-modifiable storage of security data such as keys, code, or certificates.

The system can include an OEM management system 924, the factory management system 930, a job creation and job runner system, and the device data tracking system 934 to manage the status data for the programmable devices 128. The various systems can be implemented in a variety of ways. For example, the OEM management system 924, the factory management system 930, a job creation and job runner system, and the device data tracking system 934 can all be executed as software on the host system 936. In another example, the systems can each run on dedicated hardware.

In this security model, the factory premise 942 can act as a proxy for the OEM user and can execute the functionality of the OEM management system 924. This effectively implies that the OEM user 968 implicitly trusts the factory premise 942 with providing the OEM key materials 904 and the OEM certificate 951 and setting the production count 948 for the programmable devices 128. Since this activity is done on the host system 936 of the programming unit 110, the job setup, the generation of the OEM Key Material 904, and the configuration of the secure programming system 100 be done by authorized personnel at a physically secure location within the factory premise 942.

Some implementations can focus on the provisioning of the OEM device certificates 946 onto the programmable devices 128 that are being configured as secure elements. However, it is understood that securing the flow of the OEM key material 904 and secure updating of the production count 948 by the OEM systems are protected by physical security means and secure data channels.

The OEM data from the OEM development premises 940 is secure and encrypted from OEM management system 924 all the way to the factory security system 932 as the data is encrypted and tied to a specific one of the factory security system 932. For example, the programming project 944 can be encrypted using the factory security system certificate 933 which can only be decrypted by the intended one of the factory security system 932.

In another example, the transfer of the OEM key material 904, including the OEM device certificate signature key 947 is done securely because the material is encrypted during transmission. The OEM device certificate signature key 947 can include a private key component.

In an illustrative example, since the private key 152 of the programmable devices 128 never leaves the device and the import of the OEM Device Certificate signature key 947 into OEM management system 924 is done securely. This can reduce the need for physical security since the data is encrypted.

In another illustrative example, the MSP system 902 can be operated based on a microcontroller unit use case 972 where the MSP system 902 is used for provisioning the programmable devices 128 and trusted devices 130, such as secure microcontroller units. The secure microcontroller units can include secure processing and secure storage facilities.

The MCU use case 972 can include two primary steps. In the first step, the OEM security boot loader 906 can be programmed into the programmable devices 128. Afterward, the programmable devices 128 can be booted using the OEM security boot loader 906 to create device authentication key pairs 974 and device decryption key pairs 976 for the programmable devices 128. Then the OEM device certificate 946 can be constructed, programmed, and signed using portions of the two key pairs.

In the second step, the MSP system 902 can read the silicon vendor device certificates 926 and authenticate the programmable devices 128. The firmware decrypt key 922 can be encrypted with device decryption key from the silicon vendor device certificate 926. The encrypted firmware and the encrypted firmware decrypt key 922 can be programmed on the programmable devices 128.

The OEM security boot loader 906, the OEM firmware development 908, the OEM mastering tool 910, the OEM management system 924, and the generation of the OEM Key Material 904 can all be performed at the OEM development premise 940. The overall project definition and the determination of the production count 948 are controlled by OEM user 968.

The OEM software execution environment can be hosted on a computer at the OEM development premise 940. All the OEM Roots of Trust are securely transported from the OEM development premise 940 to the factory premise 942. The factory management system 930, the factory security system 932, and the device data tracking system 934 can execute at the factory premise 942 on the host system 936.

In an embodiment, because the first step requires secure provisioning of the programmable devices 128, it must be performed in a secure facility, such as an OEM trusted factory, a silicon vendor factory, an OEM factory, or a programming center. Step 2 can then be performed at a facility with a lower level of security, such as an untrusted Factory, a Contract Manufacturer, third party partner, or a similar type of facility.

In this Security model, the OEM Roots of Trust and the programming project 944 are defined at the OEM development premise 940 and the distributed to the factory premise 942. It is important that an OEM user should manager their own Roots of Trust to improve security of the supply chain for the OEM products.

In an illustrative example, the MCU use case 972 requires physical security because the key pair 150 of the programmable devices 128 is generated in the factory security system 932 and can potentially be exposed at the factory premise 942. The physical connection between the programmable devices 128 and the programmer 112 is in the clear, so someone with physical access to the systems of the factory premise 942 could snoop and steal important information. Thus, physical security should be implemented to protect the security information.

In an alternate example of the MCU use case 972, the programmable devices 128 can be blank and not pre-programmed with the silicon vendor device certificate 926. In this case, the OEM device certificate 946 can be used for authentication. In addition, the firmware decrypt key 922 can be encrypted using the public decryption key from the OEM device certificate 946, such as the OEM public key 962.

Figure 10:
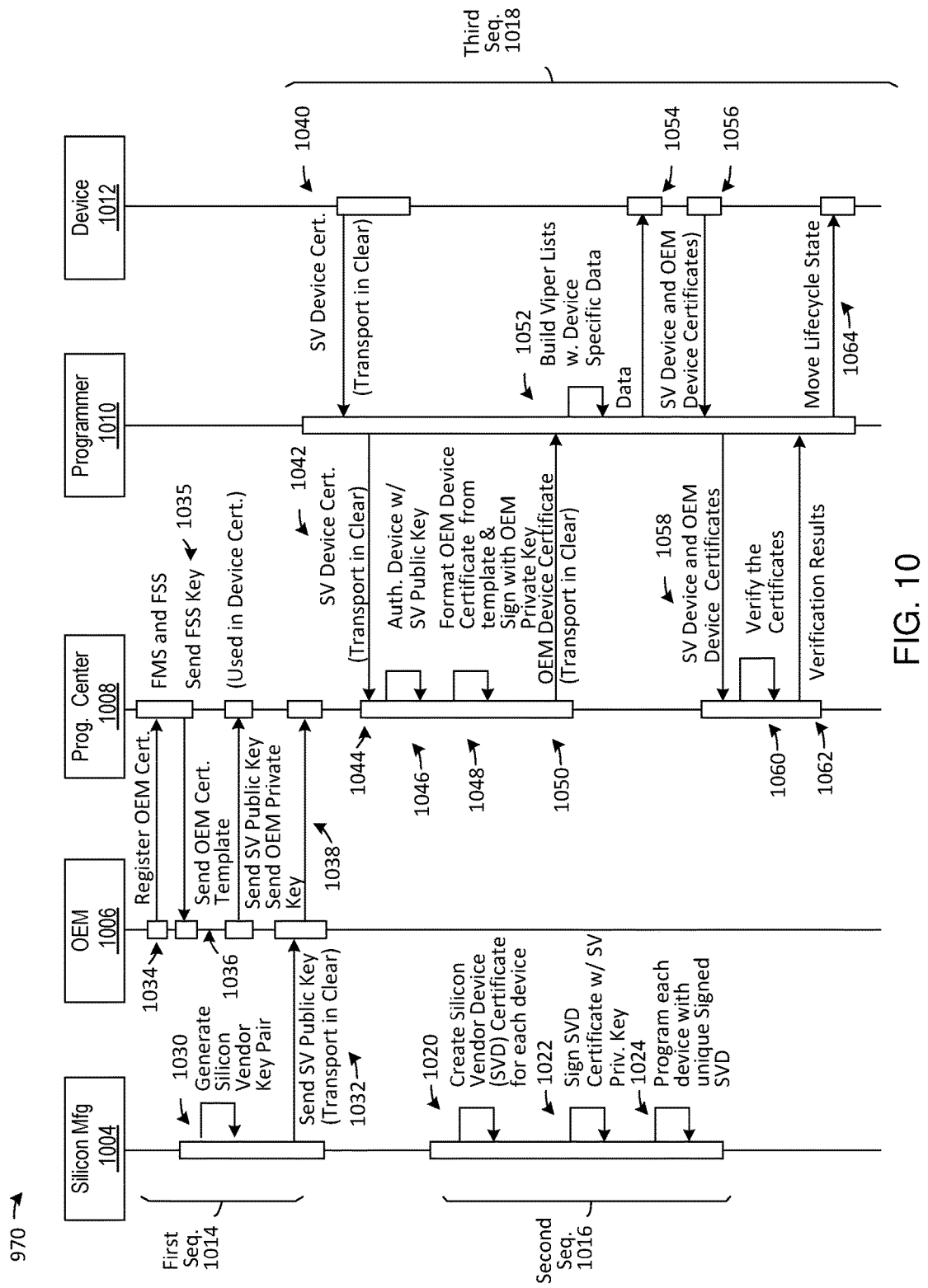
FIG. 10 is a detailed example of the secure element use case.

Referring now to FIG. 10, therein is shown a detailed example of the secure element use case 970. The secure element use case 970 describes the process for securely configuring the secure elements, such as the programmable devices 128. The MSP system 902 can securely deploy and provision each of the programmable devices 128 according to the secure element use case 970.

In the secure element use case 970, the secure elements can be instantiated, transferred, and managed at different premises. The premises can include different types of locations such as a silicon manufacturer 1004, an OEM location 1006, a programming center 1008, a programmer location 1010, and a device location 1012. Each of the premises represents a location where some type of secure programming related actions can occur. Further, the use case can include data and actions embedded at the programmer 112 and the device location 1012.

The secure element use case 970 can include three different sequences of events, each for performing a different secure activity. In a first sequence 1014, the MSP system 902 can initialize the factory security system 932 using OEM management system 924. This can be performed at the OEM development premise 940, the factory premise 942, or another similar location.

The MSP system 902 can also initialize the factory management system 930 at the factory premise 942, the programming center 1008, or another similar location. The factory management system 930 can be updated with the current count 978, a silicon vendor public key 954, an OEM private key 952, and a OEM device certificate template 950. The factory management system 930 can forward the information to the factory security system 932 for secure processing.

In the second sequence 1016, the secure elements are programmed at the silicon vendor (SV) factory with a silicon vendor device certificate 926.

In a third sequence 1018, the MSP system 902 can cryptographically authenticate each of the devices, such as the programmable devices 128 or trusted devices 130, using the silicon vendor device certificate 926 that was pre-installed in the second sequence 1016. Then the OEM device certificate 946 can be constructed and programmed into the programmable devices 128.

The OEM device certificate 946 can be constructed by re-using the public key portions of the device identity key pair from the silicon vendor device certificate 926, such as the silicon vendor public key 954. Therefore, the silicon vendor public key 954 can be used to calculate the OEM device certificate 946, so both certificates are certified using the same certificate. Alternatively, a different key pair can be used to represent the OEM identity separate from the silicon vendor key pair. This can be performed by the factory security system 932 or on the secure element itself.

In the second sequence 1016, step 1020 is performed at the silicon manufacturer 1004. The silicon manufacturer 1004 can be the company that creates the raw secure elements. The silicon vendor device certificates 926 are created for each of the secure elements, such as the programmable devices 128 or trusted devices 130. The silicon vendor device certificates 926 can include unique information about each of the secure elements, such as the device identification 302, serial numbers, product type, manufacture date, or similar device information.

Step 1022 is also performed at the silicon manufacturer 1004. Each of the silicon vendor device certificates 926 is signed with the silicon vendor private key 958 of the silicon manufacture with the silicon vendor identifier 956. Signing the silicon vendor device certificate 926 encrypts the data of the certificate. The data can be decrypted only with the silicon vendor public key 954.

Step 1024 is also performed at the silicon manufacturer 1004. Each of the programmable devices 128 is programmed with the silicon vendor device certificate 926 that was signed with the silicon vendor private key 958. The silicon vendor device certificate 926 signed by the silicon vendor private key 958 shows that the device is approved or provided by the silicon vendor. Successfully decrypting the silicon vendor device certificate 926 with the silicon vendor public key 954 can authenticate that the programmable device 128 is from the silicon vendor that signed it.

The second sequence 1016 can uniquely tag each of the programmable devices 128 with a unique and individual instance of the silicon vendor device certificate 926 that has been further signed with the silicon vendor private key 958. This provides that the silicon vendor device certificate 926 can be decoded using the silicon vendor public key 954 to verify that the silicon vendor device certificate 926 was provided by the silicon vendor having the silicon vendor identifier 956. This allows the factory or other device user to determine the authenticity of the programmable devices 128.

The first sequence 1014 is performed at the silicon manufacturer 1004, the OEM location 1006, and the programming center 1008. The first sequence 1014 can configure the programming components at the programming center 1008 for secure programming.

In a step 1030, the silicon vendor can generate the silicon vendor key pair 960 having a silicon vendor public key 954 and a silicon vendor private key 958. This can be a silicon vendor key pair 1080 having a silicon vendor private key 958 and silicon vendor public key 954.

In a step 1032, the silicon vendor public key 954 can be transferred to the OEM user 1006. The silicon vendor public key 954 can be sent in the clear and unencrypted. For example, the silicon vendor public key 954 can be sent over a network link.

In a step 1034, the OEM user 1006 can register the OEM certificate 951 with the factory management system 930 and the factory security system 932 of the programming center 1008. The OEM certificate 951 can include the OEM public key 962 to decrypt and authenticate information that was encrypted or signed with the OEM private key 962. The registration of the OEM certificate at the programming center 1008 can be performed securely to provide the programming center 1008 with the security information for the OEM user 1006. The registration can be performed to introduce and identify the OEM credentials into the factory management system 930 and the factory security system 932.

In a step 1035, the factory management system 930 and the factory security system 932 can send a factory security system encryption key 980 to the OEM management system 924 in a secure exchange process. The factory security system data encryption key 980 can be used to encrypt information sent from the OEM user 1006 to the factory management system 930 and the factory security system 932 to support the secure transfer of information. The factory security system 932 can send the factory security system data encryption key to the OEM management system 924.

In a step 1036, the OEM user 1006 can create a package having the SV device authentication public key, the OEM device certificate signature key, and the OEM device certificate template 950. The OEM device certificate signature key can be created in OEM management system 924 or imported from an external security system such as an external HSM. The package can be encrypted in the OEM management system 924 using the factory security system data encryption key 980 and then sent to the factory management system 930 and the factory security system 932. Because the package has been encrypted using the factory security system data encryption key 980 of the factory security system 932, it can only be decrypted using the factory security system data authentication key 982 of the factory security system 932. The OEM device certificate template 950 is a template for the OEM device certificate 946 that includes the public key 152 of the device having the device identification 320 and then signed by the OEM Private Signature key. The OEM public key 962 is a cryptographic value tied to the OEM user 1006. The OEM public key 962 have a variety of formats. For example, the key can be formatted as an X.509 public key certificate or another public key format. The X.509 standard defines a public key certificate to show the ownership of a public key. The OEM public key 962 can provide validation information for a public key. The OEM public key 962 can be used for device certification in the programming center 1008.

In a step 1038, the OEM user 1006 can send the package having the silicon vendor public key 954, the OEM private key 952, and the OEM device certificate template 950 to the programming center 1008. The information in the package can then be used to sign the programmable devices 128.

The third sequence 1018 is performed on the programmer 112 and the programmable devices 128 at the programming center 1008 or a factory premise 942. The third sequence 1018 can authenticate the secure elements, provision and cryptographically sign the secure elements with the OEM information, and verify that the provisioned devices are authorized.

In a step 1040, the programmer 112 can read the silicon vendor device certificate 926 of each of the programmable devices 128 to be programmed. The silicon vendor device certificates 926 are transferred in the clear from the programmable devices 128 to the programmer 112.

In a step 1042, the silicon vendor device certificates 926 can be transferred from the programmer 112 to the factory management system 930 and the factory security system 932. The factory management system 930 controls the programming operation and the factory security system 932 will manage the device and system security.

In a step 1044, the silicon vendor device certificates 926 are received at the factory management system 930 of the programming center 1008. The programmer 112 is located at the factory premise 942.

In a step 1046, the programmable devices 128 can be authenticated using the silicon vendor public key 954. This step confirms that the devices to be programmed are provided by the silicon vendor having the silicon vendor identifier 956. The programmable devices 128 are authenticated when the silicon vendor device certificate 926 that was signed with the silicon vendor private key 958 in sequence 1 is decrypted using the silicon vendor public key 954. If the information in the silicon vendor device certificate 926 can be accessed using the silicon vendor public key 954, then the device is authenticated.

In a step 1048, the OEM device certificate 946 is formatted based on the OEM device certificate template 950. Then OEM device certificate 946 is signed with the OEM private key 952.

In a step 1050, the OEM device certificate 946 is transferred to the programmer 112. Because the OEM device certificate 946 has been encrypted and signed with the OEM private key 952, it can be transferred in the clear.

In a step 1052, the programmer 112 can build the serial data lists 964. The serial data lists 964 are list of device specific data to be programmed into the programmable devices 128. This can include the serial numbers, the device identification, the OEM device certificate 946, manufacturing markers, code, data, markers, mac addresses, device specific keys, or other information.

In a step 1054, the device specific data included on the serial data lists 964 can be programmed into the programmable devices 128 by the programmer 112. The serial data lists 964 can indicate where the device specific data should be stored. For example, the OEM device certificate 946 can be stored in the secure storage unit.

In a step 1056, the silicon vendor device certificate 926 and the OEM device certificate 946 are re-extracted and retrieved from the secure elements, such as the programmable devices 128 or the trusted devices 130, by the programmer 112. Even though copies of the silicon vendor device certificate 926 and the OEM device certificate 946 may already exist in the factory security system 932 or elsewhere in the system, the device certificates are re-extracted to verify the programmable devices 128 and to detect potential duplicate production runs, unauthorized duplication, or other improper activities. The validation steps can be used to ensure that the device certificates have been programmed without errors. This can include programming failures, device damages, bit errors, or similar errors.

In a step 1058, the silicon vendor device certificate 926 and the OEM device certificate 946 are sent to the factory security system 932 for verification and further use. The retrieved device certificates can be used for a second round of authentication to verify that the proper ones of the programmable devices 128 were programmed. This can be used to prevent unauthorized duplicate of the programmable devices 128 and to prevent counterfeiting the devices.

In a step 1060, the silicon vendor device certificate 926 and the OEM device certificate 946 are verified to make sure that the programmable devices 128 are proper. This can include validating the silicon vendor device certificate 926 using the silicon vendor public key 954 and validating the OEM device certificate 946 with the OEM public key 962. Validation of the device certificate involves comparing the public key in the device certificate with the public key in the silicon vendor certificate 1078 to ensure they match. In addition, the certificate can be processed through a certificate validation tool (not shown) to ensure that the format of the certificate is valid. The signature on the certificate is also validated using the factory security system 932.

In a step 1062, the verification results are sent back to the programmer 112. In a step 1064, the programmer 112 can processed the completed devices. If the programmable devices 128 are not validated, then the programmer 112 can identify the devices with a validation status indicating a bad device and transfer them to a bad devices receptacle (not shown) for disposal. If the programmable devices 128 are properly verified, then the programmable devices 128 can be updated with a verified state value and passed along as verified components. Alternatively, the programmer 112 can generate a validation report to log the device identification and the validation status of each of the programmable devices 128 in the production run. The programmable devices 128 that are invalid can be removed or destroyed at a later time.

Figure 11:
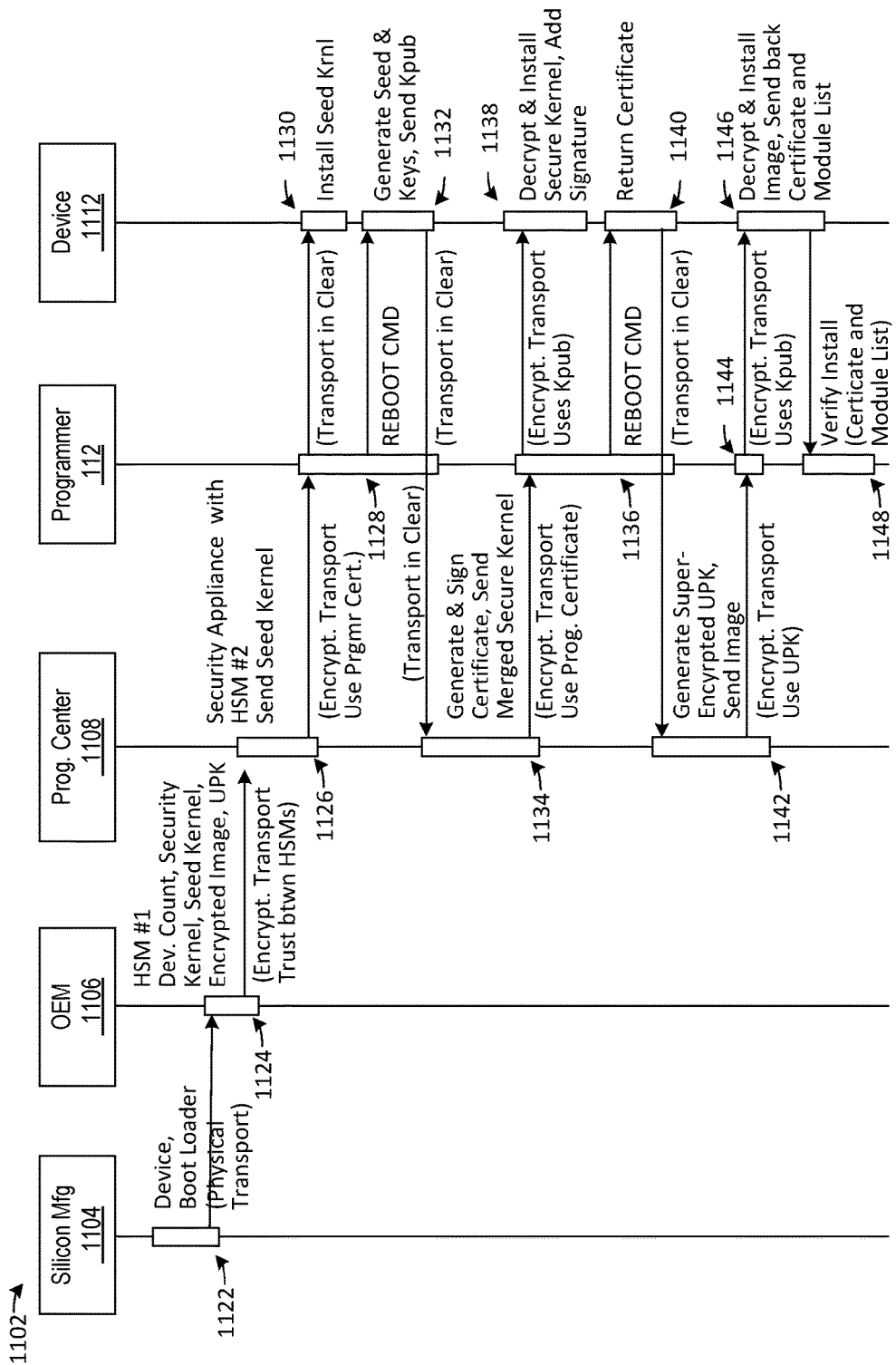
FIG. 11 is an example of an on-device seed and certificate generation use case.

Referring now to FIG. 11, therein is shown an example of an on-device use case 1102. The on-device seed use case 1102 can be performed in a hardware security module at an original equipment manufacturer location.

In the on-device seed and certificate generation use case 1102, the security elements can be instantiated and managed between several locations. The locations can include a variety of configurations. The locations can include a silicon manufacturer 1104, an original equipment manufacturer 1106, a programming center 1108, a manufacturing center, or similar location. Further, the use case can include data and actions embedded at the programmer 112 level and the device level 1112.

In a step 1122, the blank programmable devices 128 and the reference boot loader software can be provided to the microcontroller unit silicon vendor and physically transported to the second location, such as the OEM 1106, for further processing. The physical transport is a secure physical transport to prevent unauthorized access to the blank programmable devices 128 and the security software.

In a step 1124, the programmable devices 128 can be received at the second location, such as an OEM. The OEM can develop the security kernel and a security bootloader by modifying the reference boot loader software. The OEM can also develop and provide the encrypted firmware image and the firmware encryption key (UPK). The OEM can also provide a total count of the devices that need to be produced. The security kernel and the seed kernel can be kept in a first hardware security module (HSM #1) appliance at the OEM and can be provided to the programming center via encrypted transport into an on premise second hardware security module security appliance (HSM #2).

In a step 1126, the second hardware security module of a security appliance can send the seed kernel to the programmer 112. The seed is generated on the HSM#2 of the device. The seed kernel needs to be programmed into the device which will execute on-device to generate the seed and key pairs. The public key will go into the device certificates and private key can be programmed into the devices.

Step 1126 can send the seed kernel to the programmer 112 which will program the seed kernel into the device. The device is then re-booted and the seed kernel is executed. They seed kernel can then generate the key pairs. The private keys are stored in hidden memory area on the device. The public keys (Kpub) are returned back to the HSM #2. The HSM#2 can also generate signed certificates, merge them with the security kernel, and program it into the device.

This use case is the most secure use case because the device secret, the seed kernel, and the subsequent private keys are generated in the HSM#2 and are never exposed outside the device. The public keys can be send and exposed outside the device. Thus, the data exchange between the programmer 112 and the device is secure and minimizes security vulnerabilities even though some data is exchanged in the clear. This is different from the off-device seed use case 1102 where the security kernel and seed programming are transferred between the programmer and device in clear. This can potentially be a security breach if the data is intercepted and requires stricter premise security requirements.

In a step 1128, the programmer 112 can program the trusted devices 128 with the programmable payload P and then lock the device from any modification of the programmable payload. The private keys of the key pairs do not need to be programmed into the device because the device can use the seed to generate the private keys on demand at any time on the device. This generation of the private key is part of the security kernel and can only be securely accessed through security kernel.

In a step 1130, one of the programmable devices 128 can be programmed with the seed kernel. After the seed kernel has be installed, the step 1128 can continue and the programmer can issue a reboot command to the device.

In step 1132, the device can generate the device seed and security keys 106 and then generate and send the public key to the programming center level, such as the MES. The public key can be sent in the clear because the public key can be shared and is not a hidden value.

In a step 1134, the system can generate and sign the device certificate. Then the secure kernel can be merged with the device certificate and sent to the programmer 112. The merged secure kernel is sent using encrypted transport using the programmer certificate.

In a step 1136, the programmer 112 can receive the secure kernel and provision one of the secure devices 128 with the secure kernel. The secure kernel can be sent to one of the programmable devices 128 using an encrypted transport channel using the public key.

In a step 1138, the device can decrypt and install the secure kernel. In addition, the signature can be added to the device. After the secure kernel has been installed, step 1136 can sent a reboot command to the device and the device can return the certificate in a step 1140.

In a step 1142, the security appliance uses the public data encryption key from the device certificate of the device to generate the device specific super encrypted UPK. The super encrypted key and the encrypted firmware image can then be sent back to the programmer 112 for programming into one of the programmable devices 128.

In a step 1144, the encrypted file can be programmed into one of the programmable devices 128. The encrypted file can be transferred to one of the programmable devices 128 as an encrypted file using the public key.

In a step 1146, the programmer 112 can transfer the encrypted file to one of the programmable devices 128 where the image is decrypted and installed in one of the programmable devices 128. The installation of the image is qualified and verified by sending back the certificate and the module list to the programmer 112.

In a step 1148, the programmer 112 can verify the installation of the encrypted file on the programmable devices by matching the certificate and module list to a list of known certificates and modules.

Generating the device seed in the second hardware security module at the programming center increases the overall level of manufacturing security by reducing the number of opportunities for leaking the security elements. Because the programming center is a controlled environment with 24-hour a day video surveillance, the programmable devices 128 can be programmed with a higher degree of security and integrity.

3.0. Functional Overview

The secure programming system 100 can configure and provision the secure elements, such as the programmable devices 128 and the trusted devices 130, in a variety of ways. Different levels of security can be implemented depending on the type of operations that are performed on the secure elements. Different use cases and processes flows can be implemented on the same physical systems to accommodate the needs of different end users.

Figure 12:
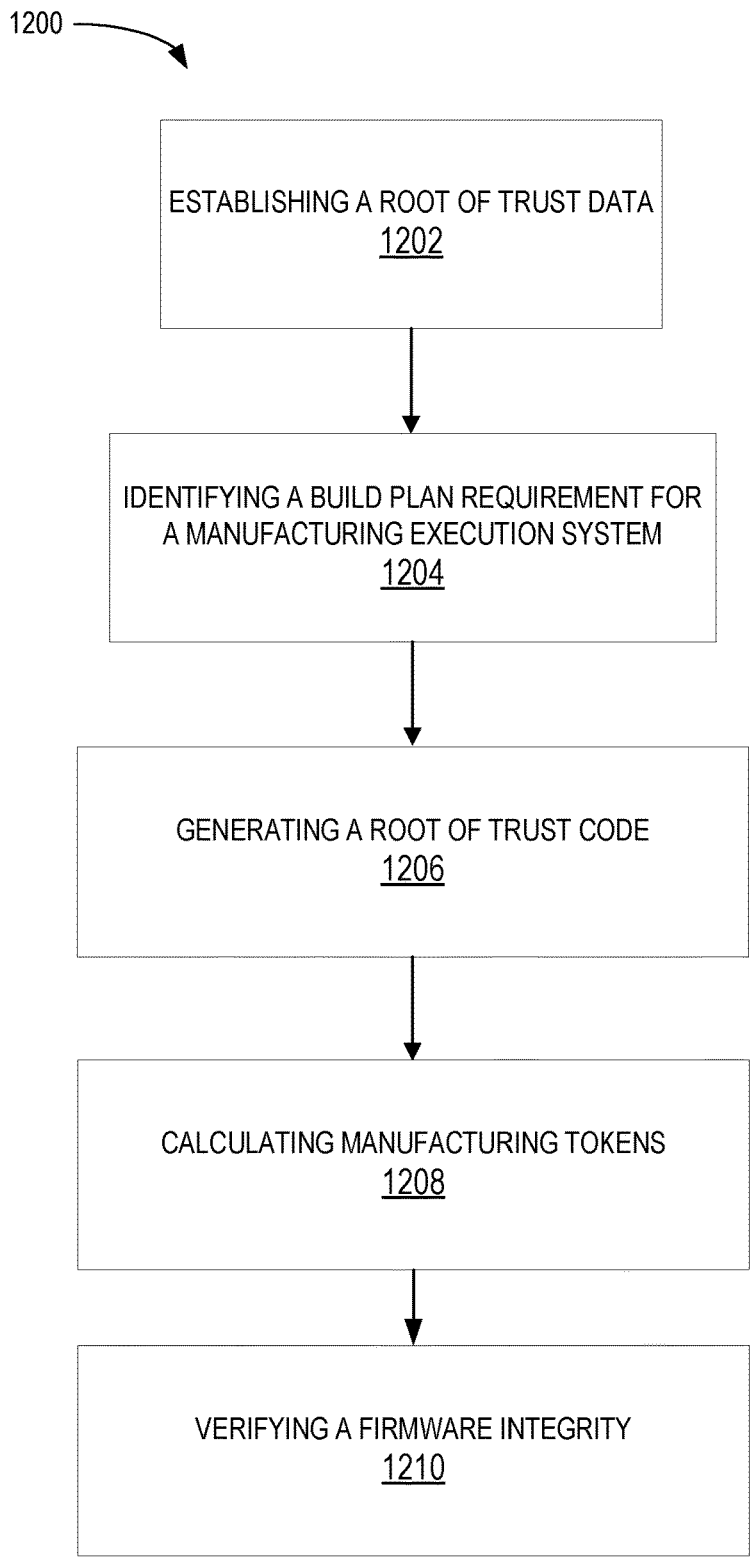
FIG. 12 is a first example of a flow chart of an embedded root of trust system according to an embodiment.

Referring now to FIG. 12, therein is shown a first example of a flow chart of an embedded root of trust system 1200 according to an embodiment. The various elements of a trusted device (e.g., 802) may be performed in a variety of systems, including systems such as a secure programming system (e.g., 100) described above. In an embodiment, each of the processes described in connection with the functional blocks described below may be implemented using a secure hardware set and secure manufacturing processes that can be verified by the trusted hardware platform at each stage of a sub-assembly manufacture.

The flow chart of the embedded root of trust system 1200 includes establishing a root of trust data (e.g., 622) in the semiconductor device in a block 1202. The root of trust data can include identification sequences designed into the circuitry of the semiconductor device to be configured during the manufacturing process of the semiconductor device.

The flow can proceed to identifying a build plan for a manufacturing execution system (e.g., 702) including determining a number and configuration of the semiconductor device in a block 1204. The requirement of the manufacturing execution system can be identified and ordered from the semiconductor manufacturer. In the case of third party manufacturing, an OEM can order the semiconductor devices configured and shipped to an assembler to support the build plan.

The flow can proceed to generating a root of trust code (e.g., 620) in a block 1206, in which the root of trust code can be generated to support the build plan of the manufacturing execution system. The root of trust code can limit an actual processing of the semiconductor device to an exact number of the devices. The root of trust code can identify what circuits can be coupled to the semiconductor device and the characteristics of the coupled semiconductor devices (e.g., a date of manufacture, a serial number range, a revision level, a manufacturing location, etc.).

The flow proceeds to calculating manufacturing tokens in a block 1208, in which the root of trust code can use the root of trust data to calculate an exact number of ID tokens (e.g., 624), provide a cryptographic token (e.g., 626), and a key token (e.g., 628) that can be used when programming the sub-assembly containing the semiconductor device. The key token and the cryptographic token can be used when firmware is loaded onto the sub-assembly. Each stage of the assembly and programming of the trusted hardware platform (e.g., 802) can be managed by the embedded root of trust system 1200.

The flow proceeds to verifying a firmware integrity in a block 1210. The integrity of the code information exchanged between systems or devices. The code signing module (e.g., 322) verifies whether content of the exchanged information has been altered or tampered using a digital signature, which can be verified using an OEM device certificate signature key (e.g., 947) or a signature stored in the root of trust data.

Figure 13:
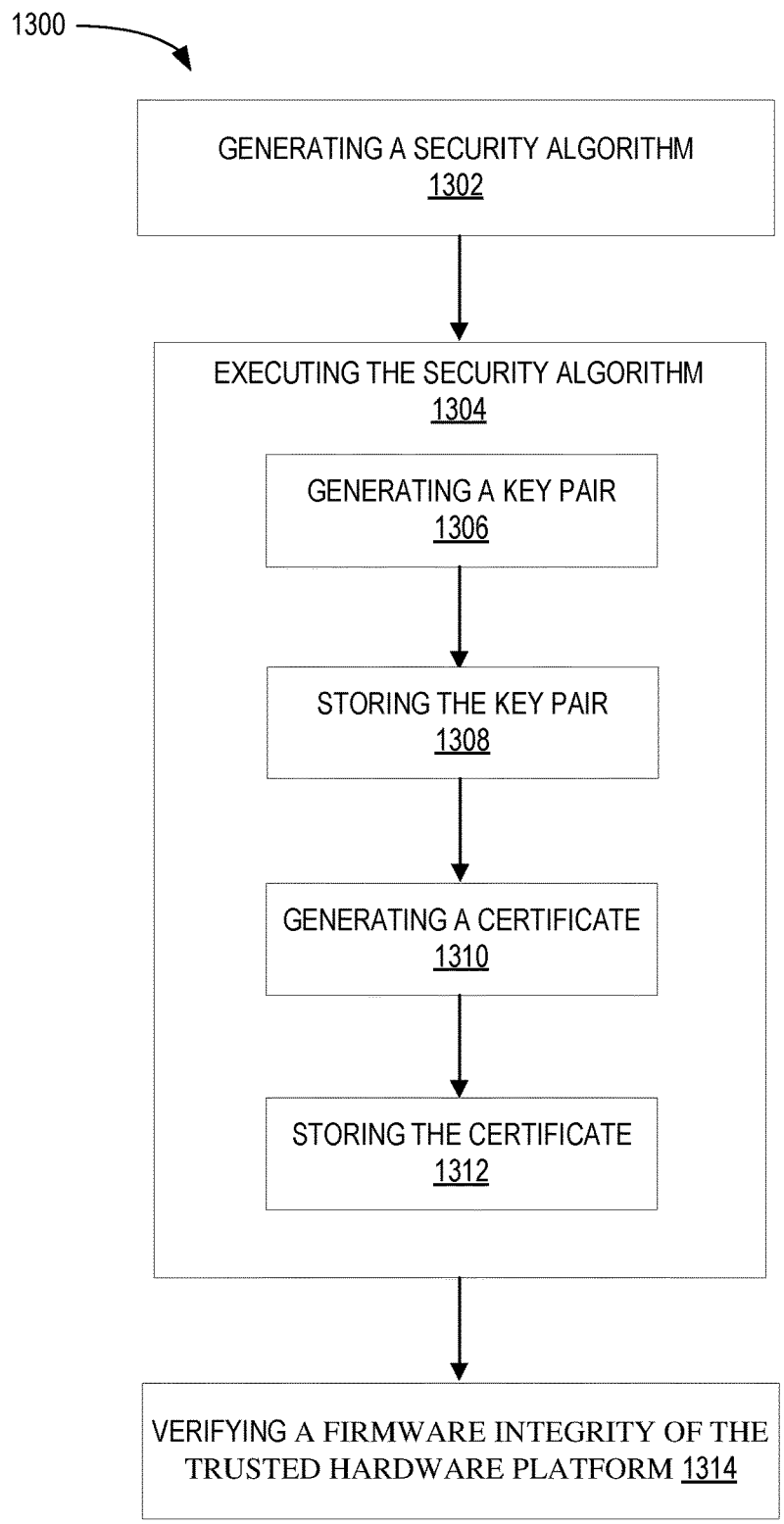
FIG. 13 is a second example of a flow chart of an embedded root of trust system in accordance with one or more embodiments.

Referring now to FIG. 13, therein is shown a second example of a flow chart of an embedded root of trust system 1300 according to an embodiment. The various elements of a trusted device (e.g., 802) may be performed in a variety of systems, including systems such as a secure programming system (e.g., 100) described above. In an embodiment, each of the processes described in connection with the functional blocks described below may be implemented using a secure hardware set and secure manufacturing processes that can be verified by the trusted hardware platform at each stage of a sub-assembly manufacture. The second example may be employed for programming an OEM certificate (e.g., 951) using an OEM identifier (e.g., 966) into a programmable device (e.g., 128). Alternatively, the second example may be employed for programming of an OEM device certificate (e.g., 946) that identifies a specific OEM device into the programmable device.

The flow chart of the embedded root of trust system 1300 includes generating a security algorithm (e.g., 304) to embed a root of trust (RoT) into the programmable device in a block 1302. The security algorithm and the RoT are stored in a RoT code register (e.g., 621) of the programmable device by a programmer (e.g., 112). The security algorithm can be generated using a programming project (e.g., 944) at an original equipment manufacturer (OEM) development premise (e.g., 940) and programmed into the programmable device by the programmer at a factory premise (e.g., 942).

The security algorithm is a process for a hardware system to perform. For example, the RoT can include at least an identification token (e.g., 624), an OEM certificate (e.g., 951), and the OEM device certificate. The OEM certificate can include an OEM identifier (e.g., 966) and an OEM public key (e.g., 962). The OEM certificate has only the OEM public key and not an OEM private key (e.g., 952).

The security algorithm is related to all or at least a number of programming steps that a programming unit (e.g., 110) executes to program data and code associated with the RoT being programmed into the programmable device. The security algorithm includes a security code element (e.g., 314). The RoT-Code provides an application programming interface (API) to external systems to control security functionality on a trusted device (e.g., 130). The security algorithm can be customized or different to each trusted device of a group of trusted devices that are programmed at a factory premise (e.g., 942) using the same programming project. For example, the security code element can include a source code, an executable code, a library module, a link module, configuration files, initialization data, hardware control codes, or a combination thereof. Also, for example, the security algorithm can be optionally stored in a secure storage unit (e.g., 326) of the programmable device and executed in an execution unit (e.g., 324) of the programmable device. Security algorithms can generally run on a programmer (e.g., 112) and inject data and code related to a Root of Trust into the programmable device. Further, for example, security algorithms can become part of a job for traceability purpose but may be rarely stored on the programmable device. The security algorithms can be stored on the programmable device, but they are generally not stored on the programmable device.

The flow can proceed to executing the security algorithm on the hardware system in a block 1304. The hardware system can include at least the programmer, a factory security system (e.g., 932), a host system (e.g., 836), the execution unit, or a combination thereof. For example, the programmer or a security controller (e.g., 114) of the programming unit executes the security algorithm to generate security information for the programmable device.

The security algorithm instructs the hardware system to generate the security information including, but not is not limited to, a key pair in a block 1306. For example, the key pair can be generated using the factory security system. The key pair can include an OEM device public key or a silicon vendor public key (e.g., 954) and an OEM device private key or a silicon vendor private key (e.g., 958).

The security algorithm instructs the hardware system to store the key pair in the programmable device in a block 1308. The programmer communicates with the execution unit to store the key pair into the secure storage unit.

The security algorithm instructs the hardware system to generate the OEM device certificate using the OEM device public key in a block 1310. The OEM device certificate can be generated using the factory security system. The OEM certificate can include an OEM identifier (e.g., 966). The OEM device certificate can be signed by the factory security system using the OEM device certificate signature key (e.g., 947).

The security algorithm instructs the hardware system to store the OEM device certificate into the programmable device in a block 1312. The OEM device certificate can be stored using the execution unit.

The security algorithm completes when the OEM device certificate is programmed into the programmable device. The security algorithm is created particularly for each programmable device. The code that makes up the security algorithm can come from a job package or a programming project (e.g. 944). The security algorithm can be bundled together with data of the programming project that is to be programmed into the programmable device.

The flow can proceed to verifying the programmable device in a block 1314 to ensure that the OEM device certificate has the proper device credentials and has been programmed properly. The programmable device can be verified by the programmer, the host system, the factory security system, or a combination thereof.

For example, the programmer or the host system requests the execution unit to retrieve the OEM device certificate from the secure storage unit. The programmer or the execution unit validates that the OEM device certificate is signed by the OEM device certificate signature key. Using the OEM device public key in the OEM device certificate, the programmer or the execution unit challenges the programmable device to decrypt an encrypted data stream. If a response from the programmable device (e.g., a decrypted data stream) matches the original data stream from the programmer or the execution unit, the OEM device certificate that has been programmed is validated.

In an embodiment, a factory management system (e.g., 930) manages multiple systems. The factory management system takes an input or request from an OEM management system (e.g., 924) and just passes it on to the factory security system.

Among other benefits, the security algorithm is used to extract device specific complexity of how to create and program the RoT and create an abstraction layer to extract the complexity away from the OEM by providing an application programming interface (API) to firmware on the programmable device so that the RoT's can be manipulated by the firmware.

In an embodiment, only the factory security system may be employed to perform all security transactions (e.g., key generation, key validation, signature generation and validation, etc.). A factory management system (e.g., 930) may not be employed to perform these transactions.

The system may be performed for fraudulent detection and prevention of programmable devices (e.g., 128), in accordance with one or more embodiments. Although an example of the system is described, other embodiments are applicable to any system that can be used to perform the functionality described herein. Components of the system may be connected by, for example, a data bus, a data link, a Local Area Network (LAN), Wide Area Network (WAN), the Internet, Intranet, Extranet, etc. Any number of devices within the system may be directly connected to each other through wired or wireless communication segments.

4.0. Example Embodiments

Examples of some embodiments are represented, without limitation, in the following clauses:

According to an embodiment, a system comprises: an identification module, implemented at least partially by hardware, that generates an identification token used by a manufacturing execution system based on a root of trust data register of a programmable device and a root of trust code register of the programmable device; a cryptography module, implemented at least partially by hardware, that calculates a cryptographic token and a key token for authentication of the trust data register and the root of trust code register; an authentication module, implemented at least partially by hardware, that verifies a trusted hardware platform based on the cryptographic token and the key token; and a code signing module, implemented at least partially by hardware, that verifies a firmware integrity of the trusted hardware platform before programming the programmable device.

In an embodiment, wherein the root of trust code register includes a security algorithm generated using a programming project at an original equipment manufacturer (OEM) development premise and stored in the programmable device by a programmer at a factory premise.

In an embodiment, further comprising a factory security system, implemented at least partially by hardware, that stores a root of trust (RoT) in the programmable device based on the security algorithm.

In an embodiment, wherein the programmer generates security information for storing in the programmable device based on the security algorithm.

In an embodiment, wherein the programmer stores a key pair in the programmable device based on the security algorithm.

In an embodiment, wherein the programmer generates a certificate with a public key and a private key based on the security algorithm.

In an embodiment, wherein the programmer stores the certificate in the programmable device based on the security algorithm.

According to an embodiment, a method comprises: generating an identification token used by a manufacturing execution system based on a root of trust data register of a programmable device and a root of trust code register of the programmable device; calculating a cryptographic token and a key token for authentication of the trust data register and the root of trust code register; verifying a trusted hardware platform based on the cryptographic token and the key token; and verifying a firmware integrity of the trusted hardware platform before programming the programmable device.

In an embodiment, further comprising: generating a security algorithm using a programming project at an original equipment manufacturer (OEM) development premise; and storing the security algorithm in the root of trust code register of the programmable device by a programmer at a factory premise.

In an embodiment, further comprising storing a root of trust (RoT) in the programmable device based on the security algorithm.

In an embodiment, further comprising generating security information for storing in the programmable device based on the security algorithm.

In an embodiment, further comprising storing a key pair in the programmable device based on the security algorithm.

In an embodiment, further comprising generating a certificate with a public key and a private key based on the security algorithm.

In an embodiment, further comprising storing the certificate in the programmable device based on the security algorithm.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 14:
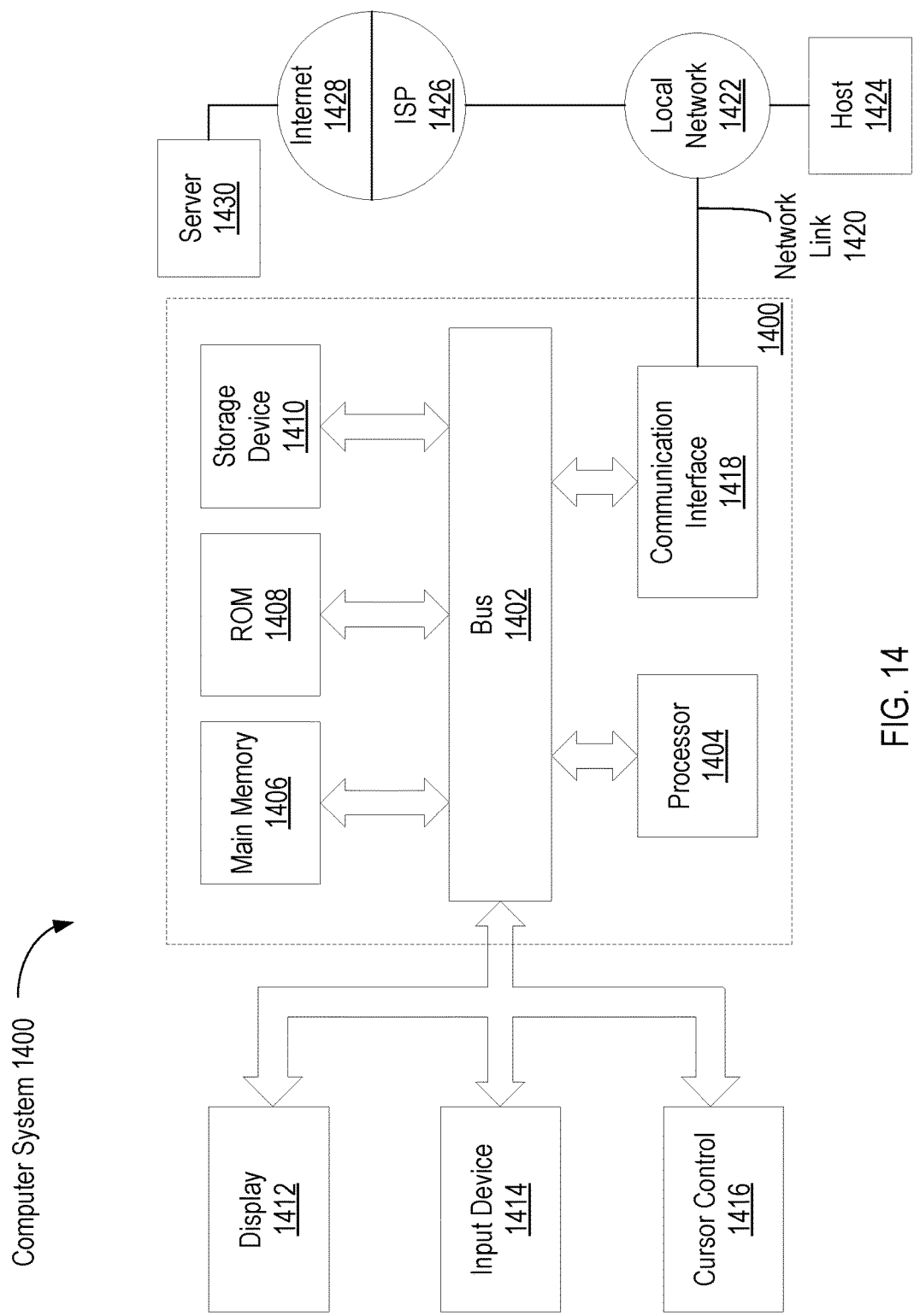
FIG. 14 is block diagram of a computer system upon which embodiments of the invention may be implemented.

Referring now to FIG. 14, therein is shown a block diagram that illustrates a computer system 1400 utilized in implementing the above-described techniques, according to an embodiment. Computer system 1400 may be, for example, a desktop computing device, laptop computing device, tablet, smartphone, server appliance, computing mainframe, multimedia device, handheld device, networking apparatus, or any other suitable device.

Computer system 1400 includes one or more busses 1402 or other communication mechanism for communicating information, and one or more hardware processors 1404 coupled with busses 1402 for processing information. Hardware processors 1404 may be, for example, a general-purpose microprocessor. Busses 1402 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1400 also includes a main memory 1406, such as a random-access memory (RAM) or other dynamic or volatile storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes one or more read only memories (ROM) 1408 or other static storage devices coupled to bus 1402 for storing static information and instructions for processor 1404. One or more storage devices 1410, such as a solid-state drive (SSD), magnetic disk, optical disk, or other suitable non-volatile storage device, is provided and coupled to bus 1402 for storing information and instructions.

Computer system 1400 may be coupled via bus 1402 to one or more displays 1412 for presenting information to a computer user. For instance, computer system ~00 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1412 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1412.

In an embodiment, output to display 1412 may be accelerated by one or more graphics processing unit (GPUs) in computer system 1400. A GPU may be, for example, a highly parallelized, multi-core floating point processing unit highly optimized to perform computing operations related to the display of graphics data, 3D data, and/or multimedia. In addition to computing image and/or video data directly for output to display 1412, a GPU may also be used to render imagery or other video data off-screen, and read that data back into a program for off-screen image processing with very high performance. Various other computing tasks may be off-loaded from the processor 1404 to the GPU.

One or more input devices 1414 are coupled to bus 1402 for communicating information and command selections to processor 1404. One example of an input device 1414 is a keyboard, including alphanumeric and other keys. Another type of user input device 1414 is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. Yet other examples of suitable input devices 1414 include a touch-screen panel affixed to a display 1412, cameras, microphones, accelerometers, motion detectors, and/or other sensors. In an embodiment, a network-based input device 1414 may be utilized. In such an embodiment, user input and/or other information or commands may be relayed via routers and/or switches on a Local Area Network (LAN) or other suitable shared network, or via a peer-to-peer network, from the input device 1414 to a network link 1420 on the computer system 1400.

A computer system 1400 may implement techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1400 can receive the data on the network and demodulate the signal to decode the transmitted instructions. Appropriate circuitry can then place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

A computer system 1400 may also include, in an embodiment, one or more communication interfaces 1418 coupled to bus 1402. A communication interface 1418 provides a data communication coupling, typically two-way, to a network link 1420 that is connected to a local network 1422. For example, a communication interface 1418 may be an integrated services digital network (ISDN) card, cable modem, satellite modem, or a modem to provide a data communication connection to a corresponding type of telephone line. As another example, the one or more communication interfaces 1418 may include a local area network (LAN) card to provide a data communication connection to a compatible LAN. As yet another example, the one or more communication interfaces 1418 may include a wireless network interface controller, such as an 802.11-based controller, Bluetooth controller, Long Term Evolution (LTE) modem, and/or other types of wireless interfaces. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by a Service Provider 1426. Service Provider 1426, which may for example be an Internet Service Provider (ISP), in turn provides data communication services through a wide area network, such as the world-wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

In an embodiment, computer system 1400 can send messages and receive data, including program code and/or other types of instructions, through the network(s), network link 1420, and communication interface 1418. In the Internet example, a server ~30 might transmit a requested code for an application program through Internet 1428, ISP 1426, local network 1422 and communication interface 1418. The received code may be executed by processor 1404 as it is received, and/or stored in storage device 1410, or other non-volatile storage for later execution. As another example, information received via a network link 1420 may be interpreted and/or processed by a software component of the computer system 1400, such as a web browser, application, or server, which in turn issues instructions based thereon to a processor 1404, possibly via an operating system and/or other intermediate layers of software components.

In an embodiment, some or all of the systems described herein may be or comprise server computer systems, including one or more computer systems 140 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   a programming unit including:
      a security controller that generates a security algorithm in a secure execution environment, the security algorithm dynamically configured based on a device type of a programmable device;
      a programmer configured to execute the security algorithm that programs a secure application programming interface into the programmable device;
      an identification device, implemented at least partially by hardware, that generates an identification token based on a root of trust data register of the programmable device and a root of trust code register of the programmable device;
      a cryptography device, implemented at least partially by hardware, that calculates a cryptographic token and a key token for authentication of the root of trust data register and the root of trust code register;
      an authentication device, implemented at least partially by hardware, that verifies the programmable device is authorized to access the programmer by validating the identification token with the key token; and
      a code signing device, implemented at least partially by hardware, that verifies a digital signature of a payload before the programmer programs the payload in the programmable device using the secure application programming interface.

2. The apparatus as recited in claim 1, wherein the root of trust code register includes the security algorithm generated using a programming project at an original equipment manufacturer (OEM) development premise and stored in the programmable device by the programmer at a factory premise.

3. The apparatus as recited in claim 2, further comprising a factory security system, implemented at least partially by hardware, that stores a root of trust (RoT) in the programmable device based on the security algorithm.

4. The apparatus as recited in claim 2, wherein the programmer generates security information for storing in the programmable device based on the security algorithm.

5. The apparatus as recited in claim 2, wherein the programmer stores a key pair in the programmable device based on the security algorithm.

6. The apparatus as recited in claim 2, wherein the programmer generates a certificate with a public key and a private key based on the security algorithm.

7. The apparatus as recited in claim 6, wherein the programmer stores the certificate in the programmable device based on the security algorithm.

8. A method comprising:
   generating a security algorithm in a secure execution environment, the security algorithm dynamically configured based on a device type of a programmable device;
   executing the security algorithm on the programmer to program a secure application programming interface into the programmable device;
   generating an identification token used by a manufacturing execution system based on a root of trust data register of the programmable device and a root of trust code register of the programmable device;
   calculating a cryptographic token and a key token for authentication of the root of trust data register and the root of trust code register;

verifying the programmable device is authorized to access the programmer by validating the identification token with the key token; and verifying a digital signature of a payload before the programmer programs the payload in the programmable device using the secure application programming interface.

9. The method of claim 8, further comprising:

generating the security algorithm using a programming project at an original equipment manufacturer (OEM) development premise; and storing the security algorithm in the root of trust code register of the programmable device by a programmer at a factory premise.

10. The method of claim 9, further comprising storing a root of trust (RoT) in the programmable device based on the security algorithm.

11. The method of claim 9, further comprising generating security information for storing in the programmable device based on the security algorithm.

12. The method of claim 9, further comprising storing a key pair in the programmable device based on the security algorithm.

13. The method of claim 9, further comprising generating a certificate with a public key and a private key based on the security algorithm.

14. The method of claim 13, further comprising storing the certificate in the programmable device based on the security algorithm.

15. One or more non-transitory computer-readable media storing instructions that, when executed by one or more computing devices, cause:

generating a security algorithm in a secure execution environment, the security algorithm dynamically configured based on a device type of a programmable device;

executing the security algorithm on a programmer to program a secure application programming interface into the programmable device;

generating an identification token used by a manufacturing execution system based on a root of trust data register of the programmable device and a root of trust code register of the programmable device;

calculating a cryptographic token and a key token for authentication of the root of trust data register and the root of trust code register;

verifying the programmable device is authorized to access the programmer by validating the identification token with the key token; and verifying a digital signature of a payload before the programmer programs the payload in the programmable device using the secure application programming interface.

16. The non-transitory computer-readable media of claim 15, further comprising:

generating the security algorithm using a programming project at an original equipment manufacturer (OEM) development premise; and storing the security algorithm in the root of trust code register of the programmable device by a programmer at a factory premise.

17. The non-transitory computer-readable media of claim 16, further comprising storing a root of trust (RoT) in the programmable device based on the security algorithm.

18. The non-transitory computer-readable media of claim 16, further comprising generating security information for storing in the programmable device based on the security algorithm.

19. The non-transitory computer-readable media of claim 16, further comprising storing a key pair in the programmable device based on the security algorithm.

20. The non-transitory computer-readable media of claim 16, further comprising generating a certificate with a public key and a private key based on the security algorithm.

* * * * *